(12) United States Patent
Wyman et al.

(10) Patent No.: US 11,942,781 B2
(45) Date of Patent: Mar. 26, 2024

(54) POWER MANAGEMENT AT A WELLSITE

(71) Applicant: Schlumberger Technology Corporation, Sugar Land, TX (US)

(72) Inventors: Paul Wyman, Katy, TX (US); Nick Krippner, Houston, TX (US); Mateo Garcia, Houston, TX (US); Vinay Krishna Pemmasani, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 155 days.

(21) Appl. No.: 17/555,722

(22) Filed: Dec. 20, 2021

(65) Prior Publication Data

US 2023/0198295 A1   Jun. 22, 2023

(51) Int. Cl.
*E21B 41/00* (2006.01)
*H02J 13/00* (2006.01)
(Continued)

(52) U.S. Cl.
CPC ........ *H02J 13/00004* (2020.01); *E21B 41/00* (2013.01); *H02J 13/00002* (2020.01);
(Continued)

(58) Field of Classification Search
CPC .......... E21B 41/00; E21B 44/00; E21B 3/022; E21B 19/00; E21B 21/01; H02J 13/00002; H02J 13/00004
See application file for complete search history.

(56) References Cited

U.S. PATENT DOCUMENTS 4,483,362 A   11/1984   Luginbuhl
4,593,763 A   6/1986   Burke
(Continued)

FOREIGN PATENT DOCUMENTS

JP   2003286901 A   10/2003
WO   2018201118 A1   11/2018
(Continued)

OTHER PUBLICATIONS

Pavkovic et al., "Oil drilling rig diesel power-plant fuel efficiency improvement potentials through rule-based generator scheduling and utilization of battery energy storage system", Energy Conversion and Management, vol. 121, 2016, pp. 194-211.
(Continued)

*Primary Examiner* — Daniel P Stephenson
(74) *Attorney, Agent, or Firm* — Jeffrey D. Frantz

(57) ABSTRACT

Systems and methods for managing power at a wellsite. A system includes well construction equipment, power equipment, a power manager, power equipment sensors operable to output power equipment sensor data indicative of operational status of the power equipment, and a human-machine interface usable by a human user to enter power management settings. The power manager is operable to receive the power equipment sensor data and receive the power management settings, wherein each power management setting is associated with a corresponding mode of operation of the power manager. The power manager is further operable to, for each power management setting, change the mode of operation of the power manager to the mode of operation associated with that power management setting, and for each mode of operation, cause the power equipment to supply electrical power to the well construction equipment in a predetermined manner with respect to that mode of operation.

11 Claims, 8 Drawing Sheets

(51) Int. Cl.
  *E21B 3/02* (2006.01)
  *E21B 19/00* (2006.01)
  *E21B 21/01* (2006.01)
(52) U.S. Cl.
  CPC ............... *E21B 3/022* (2020.05); *E21B 19/00* (2013.01); *E21B 21/01* (2013.01)

(56) References Cited

U.S. PATENT DOCUMENTS

| | | | |
|---|---|---|---|
| 5,960,883 A * | 10/1999 | Tubel | E21B 43/01 166/313 |
| 6,639,331 B2 | 10/2003 | Schultz | |
| 7,699,102 B2 | 4/2010 | Storm | |
| 8,118,012 B2 | 2/2012 | Suzuki et al. | |
| 8,186,315 B2 | 5/2012 | Jeffs et al. | |
| 8,237,300 B2 | 8/2012 | Allen | |
| 8,373,949 B2 | 2/2013 | Bourgeau | |
| 8,519,565 B2 | 8/2013 | Dozier et al. | |
| 8,604,639 B2 | 12/2013 | Hopwood | |
| 8,975,767 B2 | 3/2015 | Algrain | |
| 8,987,939 B2 | 3/2015 | Yu et al. | |
| 9,042,141 B2 | 5/2015 | Yu et al. | |
| 9,059,587 B2 | 6/2015 | Williams | |
| 9,065,300 B2 | 6/2015 | Williams | |
| 9,190,852 B2 * | 11/2015 | Bienfang | H02J 7/00 |
| 9,197,071 B2 | 11/2015 | Williams | |
| 9,240,687 B2 | 1/2016 | Carralero et al. | |
| 9,267,428 B2 | 2/2016 | Jonson et al. | |
| 9,444,252 B2 | 9/2016 | Bourgeau | |
| 9,450,433 B2 | 9/2016 | Di Cristofaro | |
| 9,535,410 B2 | 1/2017 | Di Cristofaro | |
| 9,644,431 B2 | 5/2017 | Myers et al. | |
| 9,803,461 B2 | 10/2017 | Boone | |
| 9,806,530 B2 | 10/2017 | Martinez | |
| 9,812,866 B2 | 11/2017 | Hunt | |
| 10,017,993 B2 | 7/2018 | Hu et al. | |
| 10,018,044 B2 | 7/2018 | Hu et al. | |
| 10,151,178 B2 | 12/2018 | Stephenson et al. | |
| 10,243,371 B2 | 3/2019 | Gerdes et al. | |
| 10,253,685 B2 | 4/2019 | Alexander et al. | |
| 10,283,966 B2 | 5/2019 | Macdonald | |
| 10,291,026 B2 | 5/2019 | Hunt | |
| 10,309,166 B2 | 6/2019 | Thiemann et al. | |
| 10,337,424 B2 | 7/2019 | Janik | |
| 10,389,113 B2 | 8/2019 | Bourgeau | |
| 10,390,466 B2 | 8/2019 | Held et al. | |
| 10,472,953 B2 | 11/2019 | Orban | |
| 10,491,004 B2 | 11/2019 | Gerdes et al. | |
| 10,494,992 B2 | 12/2019 | Johnson et al. | |
| 10,494,993 B2 | 12/2019 | Alexander et al. | |
| 10,530,290 B2 | 1/2020 | Janik | |
| 10,597,996 B2 | 3/2020 | Boone | |
| 10,605,162 B2 | 3/2020 | Johnson et al. | |
| 10,620,652 B2 | 4/2020 | Kubota et al. | |
| 10,649,427 B2 | 5/2020 | Krippner et al. | |
| 10,655,292 B2 | 5/2020 | Orban | |
| 10,662,709 B2 | 5/2020 | Orban | |
| 10,673,238 B2 | 6/2020 | Boone et al. | |
| 10,697,275 B2 | 6/2020 | Krippner et al. | |
| 10,699,822 B2 | 6/2020 | Orban et al. | |
| 10,724,306 B2 | 7/2020 | Myers et al. | |
| 10,724,341 B2 | 7/2020 | Krippner et al. | |
| 10,731,426 B2 | 8/2020 | Brandsvoll et al. | |
| 10,745,975 B2 | 8/2020 | Orban et al. | |
| 10,760,348 B2 | 9/2020 | Krippner et al. | |
| 10,797,510 B2 | 10/2020 | Foo et al. | |
| 10,813,256 B2 | 10/2020 | Held et al. | |
| 10,830,161 B2 | 11/2020 | Monros | |
| 10,830,162 B2 | 11/2020 | Monros | |
| 10,883,419 B2 | 1/2021 | Alexander et al. | |
| 10,920,562 B2 | 2/2021 | Janakiraman et al. | |
| 11,066,902 B2 | 7/2021 | Zhang | |
| 11,188,045 B2 | 11/2021 | Reddy | |
| 11,408,255 B2 | 8/2022 | Rouse | |
| 11,541,763 B2 | 1/2023 | Zhang | |
| 11,773,652 B2 | 10/2023 | Piraccini | |
| 2006/0196664 A1 | 9/2006 | Hall et al. | |
| 2008/0099197 A1 * | 5/2008 | Payne | E21B 47/125 166/250.01 |
| 2009/0195074 A1 | 8/2009 | Buiel | |
| 2009/0312885 A1 | 12/2009 | Buiel | |
| 2010/0306567 A1 | 12/2010 | Seiler | |
| 2014/0311806 A1 * | 10/2014 | Bruder | E21B 33/085 175/104 |
| 2015/0233213 A1 | 8/2015 | Hu et al. | |
| 2017/0133852 A1 * | 5/2017 | Macdonald | H02J 5/00 |
| 2017/0133858 A1 * | 5/2017 | Pan | H02J 5/00 |
| 2017/0229869 A1 | 8/2017 | Boone et al. | |
| 2018/0012310 A1 * | 1/2018 | Fox | G05B 19/045 |
| 2018/0355682 A1 * | 12/2018 | Pessin | H02G 11/02 |
| 2019/0115758 A1 | 4/2019 | Orban et al. | |
| 2019/0130501 A1 * | 5/2019 | Erestam | G06Q 50/08 |
| 2019/0131905 A1 | 5/2019 | Janakiraman et al. | |
| 2019/0229534 A1 | 7/2019 | Macdonald | |
| 2019/0267805 A1 | 8/2019 | Kothuru et al. | |
| 2020/0185915 A1 | 6/2020 | Bourgeau | |
| 2020/0270948 A1 | 8/2020 | Kothuru et al. | |
| 2020/0355032 A1 | 11/2020 | Myers et al. | |
| 2020/0371484 A1 | 11/2020 | Madhireddy | |
| 2020/0392814 A1 | 12/2020 | Krippner et al. | |
| 2021/0083461 A1 | 3/2021 | Orban et al. | |
| 2021/0104895 A1 | 4/2021 | Camacho Cardenas et al. | |
| 2021/0115762 A1 | 4/2021 | Garcia et al. | |
| 2021/0301630 A1 | 9/2021 | Krippner et al. | |
| 2022/0074297 A1 | 3/2022 | Zheng | |
| 2022/0140614 A1 | 5/2022 | Ough | |
| 2022/0145730 A1 | 5/2022 | Benson | |

FOREIGN PATENT DOCUMENTS

| | | | |
|---|---|---|---|
| WO | 2018213925 A1 | 11/2018 | |
| WO | WO-2019071248 A1 * | 4/2019 | ........... E21B 21/066 |
| WO | 2019084530 A1 | 5/2019 | |
| WO | 2019118352 A1 | 6/2019 | |
| WO | 2019232515 A1 | 12/2019 | |
| WO | 2021077128 A1 | 4/2021 | |

OTHER PUBLICATIONS

Bilgin et al., "World's First Hybrid Drilling Rig", IADC/SPE 199573-MS, IADC/SPE International Drilling Conference and Exhibition, 2020, 19 pages.

Search Report and Written Opinion issued in the PCT Application PCT/US2022/081669 dated Apr. 28, 2023, 11 pages.

* cited by examiner

POWER MANAGEMENT AT A WELLSITE

BACKGROUND OF THE DISCLOSURE

Wells extend into the ground or ocean bed to facilitate recovery of natural deposits of oil, gas, and other materials that are trapped in subterranean geological formations. Well construction (e.g., drilling) operations may be performed at a wellsite by a well construction system (e.g., a drilling rig) having various surface and subterranean well construction equipment operating in a coordinated manner. For example, a drive mechanism, such as a top drive located at a wellsite surface, may be utilized to rotate and advance a drill string into the subterranean formation to drill a wellbore. The drill string may include a plurality of drill pipes coupled together and terminating with a drill bit. Length of the drill string may be increased by adding additional drill pipes as depth of the wellbore increases. Drilling fluid may be pumped from the wellsite surface down through the drill string to the drill bit. The drilling fluid lubricates and cools the drill bit and carries drill cuttings from the wellbore to the wellsite surface. The drilling fluid returning to the wellsite surface may then be cleaned and again pumped through the drill string. The well construction equipment of the well construction system may be grouped into various subsystems, wherein each subsystem performs a different operation.

Electrical power for operating the well construction equipment may be supplied by electrical power equipment (or sources), including combustion engine/electrical power generator units, solar/electrical power generation units, electrical power regeneration (or regen) units, electrical power grid, and electrical power storage units, among other examples. Such electrical power equipment can be operated in an optimal manner, such as with respect to fuel efficiency, rate of pollutant emissions, equipment operational life, equipment maintenance schedules, and/or cost. However, during well construction operations, electrical power demand by the well construction equipment changes frequently and significantly during different stages of the well construction operations, and the electrical power equipment collectively outputs electrical power to match the electrical power demand regardless of efficiency based on current power control and distribution convention and methodologies. Thus, during well construction operations, the electrical power equipment operates in a less than optimal manner. For example, during stages of well construction operations demanding relatively low levels of electrical power, the generator units operate at low efficiency (e.g., engine load below optimized diesel engine performance curves). Furthermore, while operating at low efficiency, the generator units discharge gas and particulate emissions at relatively high rates. Also, during stages of well construction operations demanding relatively high levels of electrical power, one or more additional generator units may be turned on to provide additional electrical power without permitting the additional generator units to properly warm up, thereby causing unnecessary wear on the engine and the additional generator units to operate at low fuel efficiencies and discharge more exhaust gas and particulate emissions at higher rates and volumes.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a system that includes well construction equipment, power equipment, power equipment sensors, a human-machine interface (HMI), and a power manager. The well construction equipment is operable to perform well construction operations to construct a well. The power equipment is electrically connected to the well construction equipment to supply electrical power to the well construction equipment to permit the well construction equipment to perform the well construction operations. The power equipment sensors are operable to output power equipment sensor data indicative of operational status of the power equipment. The HMI is usable by a human user to enter power management settings. The power manager is communicatively connected with the power equipment, the power equipment sensors, and the HMI. The power manager includes a processor and a memory storing a computer program code that, when executed by the processor, causes the power manager to receive the power equipment sensor data and the power management settings. Each power management setting is associated with a corresponding mode of operation of the power manager. For each power management setting, the computer program code executed by the processor also causes changing the mode of operation of the power manager to the mode of operation associated with that power management setting. For each mode of operation, the computer program code executed by the processor also causes the power equipment to supply electrical power to the well construction equipment in a predetermined manner with respect to that mode of operation.

The present disclosure also introduces an apparatus that includes a power manager installable in association with a well construction rig. The well construction rig includes well construction equipment operable to perform well construction operations to construct a well, power equipment electrically connected to the well construction equipment, and power equipment sensors associated with the power equipment and operable to output power equipment sensor data indicative of operational status of the power equipment. The power equipment is operable to supply electrical power to the well construction equipment to permit the well construction equipment to perform the well construction operations. The power manager is communicatively connectable with the power equipment and the power equipment sensors. The power manager includes a processor and a memory storing a computer program code that, when executed by the processor, causes the power manager to receive the power equipment sensor data and power management settings entered by a human user via an HMI. Each power management setting is associated with a corresponding mode of operation of the power manager. For each power management setting, the computer program code executed by the processor also causes changing the mode of operation of the power manager to the mode of operation associated with that power management setting. For each mode of operation, the computer program code executed by the processor also causes the power equipment to supply electrical power to the well construction equipment in a predetermined manner with respect to that mode of operation.

The present disclosure also introduces a method that includes initiating operation of a power manager at a well construction rig. The well construction rig includes well construction equipment, power equipment electrically connected to the well construction equipment, and power equipment sensors operable to output sensor data indicative of operational status of the power equipment. The operating power manager receives the power equipment sensor data and power management settings entered via an HMI. Each power management setting is associated with a corresponding mode of operation of the power manager. For each power management setting, the operating power manager changes the mode of operation of the power manager to the mode of operation associated with that power management setting. For each mode of operation, the operating power manager causes the power equipment to supply electrical power to the well construction equipment in a predetermined manner with respect to that mode of operation.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
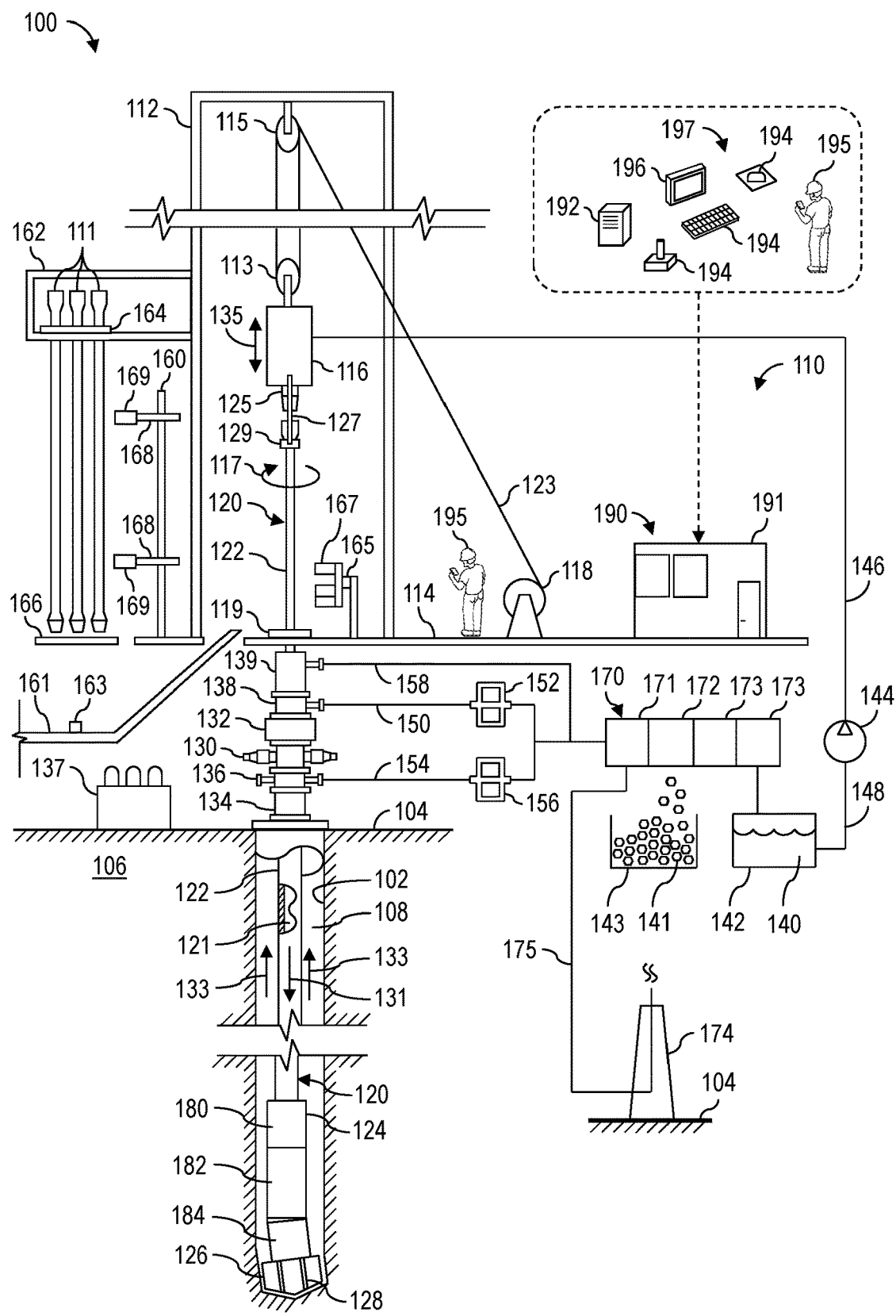
FIG. 1 is a schematic side view of at least a portion of an example implementation of apparatus according to one or more aspects of the present disclosure.

It is to be understood that the following disclosure describes many example implementations for different aspects introduced herein. Specific examples of components and arrangements are described below to simplify the present disclosure. These are merely examples, and are not intended to be limiting. In addition, the present disclosure may repeat reference numerals and/or letters in the various examples. This repetition is for simplicity and clarity, and does not in itself dictate a relationship between the various implementations described herein. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

Systems and methods (e.g., processes, operations) according to one or more aspects of the present disclosure may be utilized or otherwise implemented in association with an automated well construction system (i.e., well construction rig) at an oil and gas wellsite, such as for constructing a well (including drilling a wellbore) for extracting hydrocarbons (e.g., oil and/or gas) from a subterranean formation. However, one or more aspects of the present disclosure may be utilized or otherwise implemented in association with other automated systems in the oil and gas industry and other industries. For example, one or more aspects of the present disclosure may be implemented in association with wellsite systems for performing fracturing, cementing, acidizing, chemical injecting, and/or water jet cutting operations, among other examples. One or more aspects of the present disclosure may also be implemented in association with mining sites, building construction sites, and/or other work sites where automated machines or equipment are utilized.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a well construction (or drilling) rig and associated well construction equipment. Although the well construction system 100 is depicted as an onshore implementation, the aspects described below are also applicable or readily adaptable to offshore implementations.

The well construction system 100 is depicted in relation to a wellbore 102 formed by rotary and/or directional drilling from a wellsite surface 104 and extending into a subterranean formation 106. The well construction system 100 comprises or is associated with various well construction equipment (i.e., wellsite equipment), including surface equipment 110 located at the wellsite surface 104 and a drill string 120 suspended within the wellbore 102. The surface equipment 110 may include a mast, a derrick, and/or other support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise a plurality of interconnected tubulars, such as drill pipe, heavy-weight drill pipe (HWDP), wired drill pipe (WDP), tough logging condition (TLC) pipe, and drill collars, among other examples. The conveyance means 122 may instead comprise coiled tubing for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor 184 connected with the drill bit 126. The BHA 124 may also include various downhole devices and/or tools 180, 182.

The support structure 112 may support a driver, such as a top drive 116, operable to connect (perhaps indirectly) with an upper end of the drill string 120, and to impart rotary motion 117 and vertical motion 135 to the drill string 120, including the drill bit 126. However, other driver, such as a kelly and rotary table (neither shown), may be utilized instead of or in addition to the top drive 116 to impart the rotary motion 117 to the drill string 120. The top drive 116 and the connected drill string 120 may be suspended from the support structure 112 via a hoisting system or equipment, which may include a traveling block 113, a crown block 115, and a drawworks 118 storing a support cable or line 123. The crown block 115 may be connected to or otherwise supported by the support structure 112, and the traveling block 113 may be coupled with the top drive 116. The drawworks 118 may be mounted on or otherwise supported by the rig floor 114. The crown block 115 and traveling block 113 comprise pulleys or sheaves around which the support line 123 is reeved to operatively connect the crown block 115, the traveling block 113, and the drawworks 118 (and perhaps an anchor). The drawworks 118 may thus selectively impart tension to the support line 123 to lift and lower the top drive 116, resulting in the vertical motion 135. The drawworks 118 may comprise a drum, a base, and a prime mover (e.g., an electric motor) (not shown) operable to drive the drum to rotate and reel in the support line 123, causing the traveling block 113 and the top drive 116 to move upward. The drawworks 118 may be operable to reel out the support line 123 via a controlled rotation of the drum, causing the traveling block 113 and the top drive 116 to move downward.

The top drive 116 may comprise a grabber, a swivel (neither shown), elevator links 127 terminating with an elevator 129, and a drive shaft 125 operatively connected with a prime mover (e.g., an electric motor) (not shown), such as via a gear box or transmission (not shown). The drive shaft 125 may be selectively coupled with the upper end of the drill string 120 and the prime mover may be selectively operated to rotate the drive shaft 125 and the drill string 120 coupled with the drive shaft 125. Thus, during drilling operations, the top drive 116, in conjunction with operation of the drawworks 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The drill string 120 may be conveyed within the wellbore 102 through various fluid control devices disposed at the wellsite surface 104 on top of the wellbore 102 and perhaps below the rig floor 114. The fluid control devices may be operable to control fluid within the wellbore 102. The fluid control devices may include a blowout preventer (BOP) stack 130 for maintaining well pressure control and comprising a series of pressure barriers (e.g., rams) between the wellbore 102 and an annular preventer 132. The fluid control devices may also include a rotating control device (RCD) 138 mounted above the annular preventer 132. The fluid control devices 130, 132, 138 may be mounted on top of a wellhead 134. A power unit 137 (i.e., a BOP control or closing unit) may be operatively connected with one or more of the fluid control devices 130, 132, 138 and operable to actuate, drive, operate, or otherwise control one or more of the fluid control devices 130, 132, 138. The power unit 137 may be or comprise a hydraulic fluid power unit fluidly connected with the fluid control devices 130, 132, 138 and selectively operable to hydraulically drive various portions (e.g., rams, valves, seals) of the fluid control devices 130, 132, 138. The power unit 137 may comprise one or more hydraulic pumps actuated by electric motors and operable to pressurize hydraulic fluid for operating the fluid control devices 130, 132, 138 as described herein.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid 140 (i.e., drilling mud), and one or more mud pump units 144 (i.e., drilling fluid pumps) operable to move the drilling fluid 140 from the container 142 into the fluid passage 121 of the drill string 120 via a fluid conduit 146 extending from the pump units 144 to the top drive 116 and an internal passage extending through the top drive 116. Each pump unit 144 may comprise a fluid pump (not shown) operable to pump the drilling fluid 140 and a prime mover (e.g., an electric motor) (not shown) operable to drive the corresponding fluid pump. The fluid conduit 146 may comprise one or more of a pump discharge line, a stand pipe, a rotary hose, and a gooseneck connected with a fluid inlet of the top drive 116. The pumps 144 and the container 142 may be fluidly connected by a fluid conduit 148, such as a suction line.

During drilling operations, the drilling fluid may continue to flow downhole through the internal passage 121 of the drill string 120, as indicated by directional arrow 131. The drilling fluid may exit the BHA 124 via ports 128 in the drill bit 126 and then circulate uphole through an annular space 108 ("annulus") of the wellbore 102 defined between an exterior of the drill string 120 and the wall of the wellbore 102, such flow being indicated by directional arrows 133. In this manner, the drilling fluid lubricates the drill bit 126 and carries formation cuttings uphole to the wellsite surface 104. The returning drilling fluid may exit the annulus 108 via different fluid control devices during different stages or scenarios of well drilling operations. For example, the drilling fluid may exit the annulus 108 via a bell nipple 139, the RCD 138, or a ported adapter 136 (e.g., a spool, cross adapter, a wing valve, etc.) located below one or more rams of the BOP stack 130.

During normal drilling operations, the drilling fluid may exit the annulus 108 via the bell nipple 139 and then be directed toward drilling fluid reconditioning equipment 170 via a fluid conduit 158 (e.g., gravity return line) to be cleaned and/or reconditioned, as described below, before being returned to the container 142 for recirculation. During managed pressure drilling operations, the drilling fluid may exit the annulus 108 via the RCD 138 and then be directed into a choke manifold 152 (e.g., a managed pressure drilling choke manifold) via a fluid conduit 150 (e.g., a drilling pressure control line). The choke manifold 152 may include at least one choke and a plurality of fluid valves (neither shown) collectively operable to control the flow through and out of the choke manifold 152. Backpressure may be applied to the annulus 108 by variably restricting flow of the drilling fluid or other fluids flowing through the choke manifold 152. The greater the restriction to flow through the choke manifold 152, the greater the backpressure applied to the annulus 108. The drilling fluid exiting the choke manifold 152 may then pass through the drilling fluid reconditioning equipment 170 before being returned to the container 142 for recirculation. During well pressure control operations, such as when one or more rams of the BOP stack 130 is closed, the drilling fluid may exit the annulus 108 via the ported adapter 136 and be directed into a choke manifold 156 (e.g., a rig choke manifold, well control choke manifold) via a fluid conduit 154 (e.g., rig choke line). The choke manifold 156 may include at least one choke and a plurality of fluid valves (neither shown) collectively operable to control the flow of the drilling fluid through the choke manifold 156. Backpressure may be applied to the annulus 108 by variably restricting flow of the drilling fluid (and other fluids) flowing through the choke manifold 156. The drilling fluid exiting the choke manifold 156 may then pass through the drilling fluid reconditioning equipment 170 before being returned to the container 142 for recirculation.

Before being returned to the container 142, the drilling fluid returning to the wellsite surface 104 may be cleaned and/or reconditioned via the drilling fluid reconditioning equipment 170, which may include one or more of liquid-gas (i.e., mud gas) separators 171, shale shakers 172, and other drilling fluid cleaning and reconditioning equipment 173. The liquid-gas separators 171 may remove formation gases entrained in the drilling fluid discharged from the wellbore 102 and the shale shakers 172 may separate and remove solid particles 141 (e.g., drill cuttings) from the drilling fluid. The drilling fluid reconditioning equipment 170 may further comprise other equipment 173 operable to remove additional gas and finer formation cuttings from the drilling fluid and/or modify chemical and/or physical properties or characteristics (e.g., rheology, density, etc.) of the drilling fluid. For example, the drilling fluid reconditioning equipment 170 may include a degasser, a desander, a desilter, a centrifuge, a mud cleaner, and/or a decanter, among other examples. The drilling fluid reconditioning equipment 170 may further include chemical containers and mixing equipment collectively operable to mix or otherwise add selected chemicals to the drilling fluid returning from the wellbore 102 to modify chemical and/or physical properties or characteristics of the drilling fluid being pumped back into the wellbore 102. Intermediate tanks/containers (not shown) may be utilized to hold the drilling fluid while the drilling fluid progresses through the various stages or portions 171, 172, 173 of the drilling fluid reconditioning equipment 170. The cleaned and reconditioned drilling fluid may be transferred to the fluid container 142, the solid particles 141 removed from the drilling fluid may be transferred to a solids container 143 (e.g., a reserve pit), and/or the removed gas may be transferred to a flare stack 174 via a conduit 175 (e.g., a flare line) to be burned or to a container (not shown) for storage and removal from the wellsite.

The surface equipment 110 may include a tubular handling system or equipment operable to store, move, connect, and disconnect tubulars (e.g., drill pipes) to assemble and disassemble the conveyance means 122 of the drill string 120 during drilling operations. For example, a catwalk 161 may be utilized to convey tubulars from a ground level, such as along the wellsite surface 104, to the rig floor 114, permitting the elevator 129 to grab and lift the tubulars above the wellbore 102 for connection with previously deployed tubulars. The catwalk 161 may have a horizontal portion and an inclined portion that extends between the horizontal portion and the rig floor 114. The catwalk 161 may comprise a skate 163 movable along a groove (not shown) extending longitudinally along the horizontal and inclined portions of the catwalk 161. The skate 163 may be operable to convey (e.g., push) the tubulars along the catwalk 161 to the rig floor 114. The skate 163 may be driven along the groove by a drive system (not shown), such as a pulley system or a hydraulic system. Additionally, one or more racks (not shown) may adjoin the horizontal portion of the catwalk 161. The racks may have a spinner unit for transferring tubulars to the groove of the catwalk 161. The tubular handling system may comprise a plurality of actuators collectively operable to move various portions of the tubular handling equipment to perform the methods and operations described herein. The actuators may be or comprise electric motors and/or hydraulic cylinders and rotary actuators. The hydraulic cylinders and rotary actuators may be powered by hydraulic power packs comprising hydraulic pumps actuated by electric motors to pressurize hydraulic fluid.

An iron roughneck 165 may be positioned on the rig floor 114. The iron roughneck 165 may comprise a torqueing portion 167, such as may include a spinner and a torque wrench comprising a lower tong and an upper tong. The torqueing portion 167 of the iron roughneck 165 may be moveable toward and at least partially around the drill string 120, such as may permit the iron roughneck 165 to make up and break out connections of the drill string 120. The torqueing portion 167 may also be moveable away from the drill string 120, such as may permit the iron roughneck 165 to move clear of the drill string 120 during drilling operations. The spinner of the iron roughneck 165 may be utilized to apply low torque to make up and break out threaded connections between tubulars of the drill string 120, and the torque wrench may be utilized to apply a higher torque to tighten and loosen the threaded connections. The iron roughneck may comprise a plurality of actuators collectively operable to move various portions of the iron roughneck to perform the methods and operations described herein. The actuators may be or comprise electric motors.

A set of slips 119 may be located on the rig floor 114, such as may accommodate therethrough the drill string 120 during tubular make up and break out operations and during the drilling operations. The slips 119 may be in an open position during drilling operations to permit advancement of the drill string 120, and in a closed position to clamp the upper end (e.g., the uppermost tubular) of the drill string 120 to thereby suspend and prevent advancement of the drill string 120 within the wellbore 102, such as during the make up and break out operations.

During drilling operations, the various well construction equipment of the well construction system 100 may progress through a plurality of coordinated operations (i.e., operational sequences) to drill or otherwise construct the wellbore 102. The operational sequences may change based on a well construction plan, status of the well, status of the subterranean formation, stage of drilling operations (e.g., tripping, drilling, tubular handling, etc.), and type downhole tubulars (e.g., drill pipe) utilized, among other examples.

During drilling operations, the hoisting system lowers the drill string 120 while the top drive 116 rotates the drill string 120 to advance the drill string 120 downward within the wellbore 102 and into the formation 106. During the advancement of the drill string 120, the slips 119 are in an open position, and the iron roughneck 165 is moved away or is otherwise clear of the drill string 120. When the upper end of the drill string 120 (i.e., the upper end of the uppermost tubular of the drill string 120) connected to the drive shaft 125 is near the slips 119 and/or the rig floor 114, the top drive 116 ceases rotating and the slips 119 close to clamp the upper end of the drill string 120. The grabber of the top drive 116 then clamps the uppermost tubular connected to the drive shaft 125, and the drive shaft 125 rotates in a direction reverse from the drilling rotation to break out the connection between the drive shaft 125 and the uppermost tubular. The grabber of the top drive 116 may then release the uppermost tubular.

Multiple tubulars may be loaded on the rack of the catwalk 161 and individual tubulars may be transferred from the rack to the groove in the catwalk 161, such as by the spinner unit. The tubular positioned in the groove may be conveyed along the groove by the skate 163 until the box end of the tubular projects above the rig floor 114. The elevator 129 of the top drive 116 then grasps the protruding box end, and the drawworks 118 may be operated to lift the top drive 116, the elevator 129, and the new tubular.

The hoisting system then raises the top drive 116, the elevator 129, and the new tubular until the tubular is aligned with the upper portion of the drill string 120 clamped by the slips 119. The iron roughneck 165 is moved toward the drill string 120, and the lower tong of the torqueing portion 167 clamps onto the upper end of the drill string 120. The spinning system threadedly connects the lower end (i.e., pin end) of the new tubular with the upper end (i.e., box end) of the drill string 120. The upper tong then clamps onto the new tubular and rotates with high torque to complete making up the connection with the drill string 120. In this manner, the new tubular becomes part of the drill string 120. The iron roughneck 165 then releases and moves clear of the drill string 120.

The grabber of the top drive 116 may then clamp onto the drill string 120. The drive shaft 125 is brought into contact with the upper end of the drill string 120 (e.g., the box end of the uppermost tubular) and rotated to make up a connection between the drill string 120 and the drive shaft 125. The grabber then releases the drill string 120, and the slips 119 are moved to the open position. The drilling operations may then resume.

The tubular handling equipment may further include a tubular handling manipulator (THM) 160 disposed in association with a vertical pipe rack 162 for storing tubulars 111 (e.g., drill pipes, drill collars, drill pipe stands, casing joints, etc.). The vertical pipe rack 162 may comprise or support a fingerboard 164 defining a plurality of slots configured to support or otherwise hold the tubulars 111 within or above a setback 166 (e.g., a platform or other area) located adjacent to, along, or below the rig floor 114. The fingerboard 164 may comprise a plurality of fingers (not shown), each associated with a corresponding slot and operable to close around and/or otherwise interpose individual tubulars 111 to maintain the tubulars 111 within corresponding slots of the fingerboard 164. The vertical pipe rack 162 may be connected with and supported by the support structure 112 or other portion of the wellsite system 100. The fingerboard 164/setback 166 provide storage (e.g., temporary storage) of tubulars 111 during various operations, such as during and between tripping out and tripping of the drill string 120. The THM 160 may comprise a plurality of actuators collectively operable to move various portions of the THM 160 to perform the methods and operations described herein. The actuators may be or comprise electric motors.

The THM 160 may be operable to transfer the tubulars 111 between the fingerboard 164/setback 166 and the drill string 120 (i.e., space above the suspended drill string 120). For example, the THM 160 may include arms 168 terminating with clamps 169, such as may be operable to grasp and/or clamp onto one of the tubulars 111. The arms 168 of the THM 160 may extend and retract, and/or at least a portion of the THM 160 may be rotatable and/or movable toward and away from the drill string 120, such as may permit the THM 160 to transfer the tubular 111 between the fingerboard 164/setback 166 and the drill string 120.

To trip out the drill string 120, the top drive 116 is raised, the slips 119 are closed around the drill string 120, and the elevator 129 is closed around the drill string 120. The grabber of the top drive 116 clamps the upper end of a tubular of the drill string 120 coupled to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The iron roughneck 165 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The iron roughneck 165 then releases the drill string 120 and moves clear of the drill string 120.

The THM 160 may then move toward the drill string 120 to grasp the tubular suspended from the elevator 129. The elevator 129 then opens to release the tubular. The THM 160 then moves away from the drill string 120 while grasping the tubular with the clamps 169, places the tubular in the fingerboard 164/setback 166, and releases the tubular for storage. This process is repeated until the intended length of drill string 120 is removed from the wellbore 102.

The surface equipment 110 of the well construction system 100 may also comprise a control center 190 from which various portions of the well construction system 100, such as the top drive 116, the hoisting system, the tubular handling system, the drilling fluid circulation system, the well control system, and the BHA 124, among other examples, may be monitored and controlled. The control center 190 may be located on the rig floor 114 or other location of the well construction system 100. The control center 190 may comprise a facility 191 (e.g., a room, a cabin, a trailer, etc.) containing a control workstation 197, which may be operated by rig personnel 195 (e.g., a driller or other human rig operator) to monitor and control various well construction equipment or portions of the well construction system 100. The control workstation 197 may comprise or be communicatively connected with a central controller 192 (e.g., a processing device, a computer, etc.), such as may be operable to receive, process, and output information to monitor operations of and provide control to one or more portions of the well construction system 100. For example, the central controller 192 may be communicatively connected with the various surface and downhole equipment described herein, and may be operable to receive signals from and transmit signals to such equipment to perform various operations described herein. The central controller 192 may store executable computer program code, instructions, and/or operational parameters or set-points, including for implementing one or more aspects of methods and operations described herein. The central controller 192 may be located within and/or outside of the facility 191. Although it is possible that the entirety of the central controller 192 is implemented within one device, it is also contemplated that one or more components or functions of the central controller 192 may be implemented across multiple devices, some or an entirety of which may be implemented as part of the control center 190 and/or located within the facility 191.

The control workstation 197 may be operable for entering or otherwise communicating control data (e.g., commands, signals, information, etc.) to the central controller 192 and other equipment controller by the rig personnel 195, and for displaying or otherwise communicating information from the central controller 192 to the rig personnel 195. The control workstation 197 may comprise a plurality of HMI devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the central controller 192, the input and output devices 194, 196, and the various well construction equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, electric motors, hydraulics, actuators, valves, and/or other components not explicitly described herein may be included in the well construction system 100, and are within the scope of the present disclosure.

Figure 2:
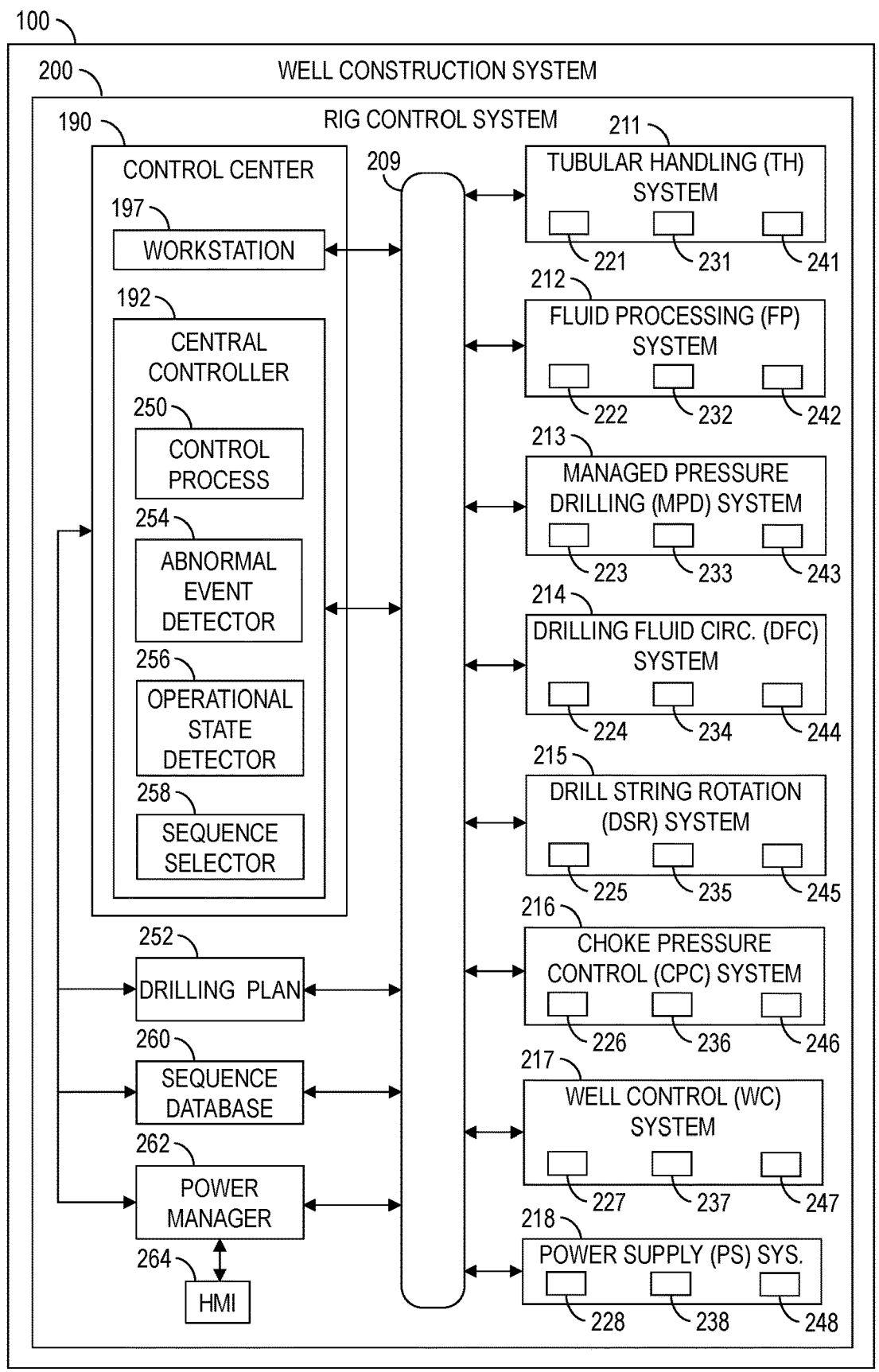
FIG. 2 is a schematic view of at least a portion of an example implementation of apparatus according to one or more aspects of the present disclosure.

The present disclosure further provides various implementations of systems and/or methods for controlling one or more portions of the well construction system 100. FIG. 2 is a schematic view of at least a portion of an example implementation of a drilling rig control system 200 (hereinafter "rig control system") for monitoring and controlling various well construction equipment of the well construction system 100 shown in FIG. 1. The rig control system 200 may comprise one or more features of the well construction system 100, including where indicated by the same reference numerals. Accordingly, the following description refers to FIGS. 1 and 2, collectively.

The rig control system 200 may be in real-time communication with, and utilized to monitor and/or control, various portions, components, and equipment of the well construction system 100 described herein. The equipment of the well construction system 100 may be grouped into several subsystems, each operable to perform a corresponding operation and/or a portion of the well construction operations described herein. The subsystems may include a tubular handling (TH) system 211, a fluid processing (FP) system 212, a managed pressure drilling (MPD) system 213, a drilling fluid circulation (DFC) system 214, a drill string rotation system (DSR) system 215, a choke pressure control (CPC) system 216, a well pressure control (WC) system 217, and a power supply (PS) system 218.

The TH system 211 may include the support structure 112, a tubular hoisting system (e.g., the drawworks 118, the elevator links 127, the elevator 129, and the slips 119), a tubular handling system or equipment (e.g., the catwalk 161, the THM 160, the setback 166, and the iron roughneck 165), and/or other tubular handling equipment. Accordingly, the TH system 211 may perform tubular handling and hoisting operations. The TH system 211 may also serve as a support platform for tubular rotation equipment and a staging ground for rig operations, such as connection make up and break out operations described above. The FP system 212 may include the drilling fluid reconditioning equipment 170, the flare stack 174, the containers 142, 143, and/or other equipment. Accordingly, the FP system 212 may perform fluid cleaning, reconditioning, and mixing operations. The MPD system 213 may include the RCD 138, the power unit 137, the choke manifold 152, and/or other equipment. The DFC system 214 may comprise the pumps 144, the drilling fluid container 142, the bell nipple 139, and/or other equipment collectively operable to pump and circulate the drilling fluid at the wellsite surface and downhole. The DSR system 215 may include the top drive 116 and/or the rotary table and kelly. The CPC system 216 may comprise the choke manifold 156, the ported adapter 136, and/or other equipment, and the WC system 217 may comprise the BOP stack 130, the power unit 137, and a BOP control station for controlling the power unit 137. The PS system 218 may comprise various sources of electrical power operable to power the well construction equipment of the well construction system 100, including the well construction equipment of the well construction subsystems 211-217. The PS system 218 may also include various means for transferring and/or distributing electrical power and fuel to the well construction equipment and between various pieces of equipment of the PS system 218, including electrical power conductors, electrical connectors, electrical relays, fluid conductors, fluid connectors, and fluid valves, among other examples. The sources of electrical power may include combustion engine/electrical power generator units, solar/electrical power generation units, electrical power regeneration units, wind/electrical power generation units, electrical power grid, electrical power storage units (e.g., batteries, capacitors, etc.), and fuel storage devices, among other examples. Each of the well construction subsystems 211-218 may further comprise various communication equipment (e.g., modems, network interface cards, etc.) and communication conductors (e.g., cables), communicatively connecting the equipment (e.g., sensors and actuators) of each subsystem 211-218 with a central controller 192 and a control workstation 197. Although the well construction equipment listed above and shown in FIG. 1 is associated with certain wellsite subsystems 211-218, such associations are merely examples that are not intended to limit or prevent such well construction equipment from being associated with two or more wellsite subsystems 211-218 and/or different wellsite subsystems 211-218.

The rig control system 200 may include various local controllers 221-228, each operable to control various well construction equipment of a corresponding subsystem 211-218 and/or an individual piece of well construction equipment of a corresponding subsystem 211-218. As described above, each well construction subsystem 211-218 includes various well construction equipment comprising corresponding actuators 241-248 for performing operations of the well construction system 100. Each subsystem 211-218 may include various sensors 231-238 operable to generate sensor data (e.g., signals, information, measurements, etc.) indicative of operational status of the well construction equipment of each subsystem 211-218. Each local controller 221-228 may output control data (e.g., commands, signals, information, etc.) to one or more actuators 241-248 to perform corresponding actions of a piece of equipment or subsystem 211-218. Each local controller 221-228 may receive sensor data generated by one or more sensors 231-238 indicative of operational status of an actuator or other portion of a piece of equipment or subsystem 211-218. Although the local controllers 221-228, the sensors 231-238, and the actuators 241-248 are each shown as a single block, it is to be understood that each local controller 221-228, sensor 231-238, and actuator 241-248 may be or comprise a plurality of local controllers, sensors, and actuators.

The sensors 231-238 may include sensors utilized for operation of the various subsystems 211-218 of the well construction system 100. For example, the sensors 231-238 may include cameras, position sensors, speed sensors, acceleration sensors, pressure sensors, force sensors, temperature sensors, flow rate sensors, vibration sensors, electrical current sensors, electrical voltage sensors, resistance sensors, gesture detection sensors or devices, voice actuated or recognition devices or sensors, chemical sensors, exhaust sensors, and/or other examples. The sensor data may include signals, information, and/or measurements indicative of equipment operational status (e.g., on or off, percent load, up or down, set or released, etc.), drilling parameters (e.g., depth, hook load, torque, etc.), auxiliary parameters (e.g., vibration data of a pump), flow rate, temperature, operational speed, position, and pressure, among other examples. The acquired sensor data may include or be associated with a timestamp (e.g., date and/or time) indicative of when the sensor data has been acquired. The sensor data may also or instead be aligned with a depth or other drilling parameter.

The local controllers 221-228, the sensors 231-238, and the actuators 241-248 may be communicatively connected with the central controller 192. For example, the local controllers 221-228 may be in communication with the sensors 231-238 and actuators 241-248 of the corresponding subsystems 211-218 via local communication networks (e.g., field buses) (not shown) and the central controller 192 may be in communication with the subsystems 211-218 via a central communication network 209 (e.g., a data bus, a field bus, a wide-area-network (WAN), a local-area-network (LAN), etc.). The sensor data generated by the sensors 231-238 of the subsystems 211-218 may be made available for use by the central controller 192 and/or the local controllers 221-228. Similarly, control data output by the central controller 192 and/or the local controllers 221-228 may be automatically communicated to the various actuators 241-248 of the subsystems 211-218, perhaps pursuant to predetermined programming, such as to facilitate well construction operations and/or other operations described herein. Although the central controller 192 is shown as a single device (i.e., a discrete hardware component), it is to be understood that the central controller 192 may be or comprise a plurality of equipment controllers and/or other electronic devices collectively operable to monitor and control operations (i.e., computational processes or methods) of the well construction system. The central controller 192 may be located within or form a portion of a control center 190, although a portion of the central controller 192 may instead be external to the control center 190.

The sensors 231-238 and actuators 241-248 may be monitored and/or controlled by corresponding local controllers 221-228 and/or the central controller 192. For example, the central controller 192 may be operable to receive sensor data from the sensors 231-238 of the wellsite subsystems 211-218 in real-time, and to output real-time control data directly to the actuators 241-248 of the subsystems 211-218 based on the received sensor data. However, certain operations of the actuators 241-248 of each subsystem 211-218 may be controlled by a corresponding local controller 221-228, which may control the actuators 241-248 based on sensor data received from the sensors 231-238 of the corresponding subsystem 211-218 and/or based on control data received from the central controller 192.

The rig control system 200 may be a tiered control system, wherein control of the subsystems 211-218 of the well construction system 100 may be provided via a first tier of the local controllers 221-228 and a second tier of the central controller 192. The central controller 192 may facilitate control of one or more of the subsystems 211-218 at the level of each individual subsystem 211-218. For example, in the FP system 212, sensor data may be fed into the local controller 242, which may respond to control the actuators 232. However, for control operations that involve multiple subsystems 211-218, the control may be coordinated through the central controller 192 operable to coordinate control of well construction equipment of two, three, four, or more (or each) of the subsystems 211-218. For example, coordinated control operations may include the control of downhole pressure during tripping. The downhole pressure may be affected by the DFC system 214 (e.g., pump rate), the MPD system 213 (e.g., position of the choke 152), and the TH system 211 (e.g., tripping speed). Thus, when it is intended to maintain certain downhole pressure during tripping, the central controller 192 may output control data to two or more of the participating subsystems 211-218.

As described above, the central controller 192 may control various operations of the subsystems 211-218 via analysis of sensor data from one or more of the wellsite subsystems 211-218 to facilitate coordinated control between the subsystems 211-218. The central controller 192 may generate control data to coordinate operations of various well construction equipment of the subsystems 211-218. The control data may include, for example, commands from rig personnel, such as turn on or turn off a pump, switch on or off a fluid valve, and update a physical property set-point, among other examples. The local controllers 221-228 may each include a fast control loop that directly obtains sensor data and executes, for example, a control algorithm to generate the control data. The central controller 192 may include a slow control loop to periodically obtain sensor data and generate the control data.

The central controller 192, the local controllers 221-228, and/or other controllers or processing devices (referred to hereinafter as "equipment controllers") of the rig control system 200 may each or collectively be operable to receive and store machine-readable and executable program code instructions (e.g., computer program code, algorithms, programmed processes or operations, etc.) on a data storage device (e.g., a memory chip) and then execute the program code instructions to run, operate, or perform a control process for monitoring and/or controlling the well construction equipment of the well construction system 100.

The central controller 192 may run (i.e., execute) a control process 250 (e.g., a coordinated control process or other computer process) and each local controller 221-228 may run a corresponding control process (e.g., a local control process or other computer process, not shown). Two or more of the local controllers 221-228 may run their local control processes to collectively coordinate operations between well construction equipment of two or more of the subsystems 211-218.

The control process 250 of the central controller 192 may operate as a mechanization manager of the rig control system 200, coordinating operational sequences of the well construction equipment of the well construction system 100. The well construction system 100 may instead be operated manually by the rig personnel (e.g., a driller) via the control workstation 197. The control workstation 197 may be utilized to monitor, configure, control, and/or otherwise operate one or more of the subsystems 211-218 by the rig personnel. The control workstation 197 may be communicatively connected with the central controller 192 and/or the local controllers 221-228 via the communication network 209 and operable to receive sensor data from the sensors 231-238 and transmit control data to the central controller 192 and/or the local controllers 221-228 to control the actuators 241-248. Accordingly, the control workstation 197 may be utilized by the rig personnel to monitor and control the actuators 241-248 and other portions of the subsystems 211-218 via the central controller 192 and/or local controllers 221-228.

During manual operation, the rig personnel may operate as the mechanization manager of the rig control system 200 by manually coordinating operations of various well construction equipment, such as to achieve an intended operational status (or drilling state) of the well construction operations, including tripping in or drilling at an intended rate of penetration (ROP). The control process of each local controller 221-228 may facilitate a lower (e.g., basic) level of control within the rig control system 200 to operate a corresponding piece of well construction equipment or a plurality of pieces of well construction equipment of a corresponding subsystem 211-218. Such control process may facilitate, for example, starting, stopping, and setting or maintaining an operating speed of a piece of well construction equipment. During manual operation of the well construction system 100, the rig personnel manually controls the individual pieces of well construction equipment to achieve the intended operational status of each piece of well construction equipment.

The control process 250 of the central controller 192 may output control data directly to the actuators 241-248 to control the well construction operations. The control process 250 may also or instead output control data to the control process of one or more local controllers 221-228, wherein each control process of the local controllers 221-228 may then output control data to the actuators 241-248 of the corresponding subsystem 211-218 to control a portion of the well construction operations performed by that subsystem 211-218. Thus, the control processes of equipment controllers (e.g., central controller 192, local controllers 221-228) of the rig control system 200 individually and collectively perform monitoring and control operations described herein, including monitoring and controlling well construction operations. The program code instructions forming the basis for the control processes described herein may comprise rules (e.g., algorithms) based on the laws of physics for drilling and other well construction operations.

Each control process being run by an equipment controller of the rig control system 200 may receive and process (i.e., analyze) sensor data from the sensors 231-238 according to the program code instructions, and generate control data (i.e., control signals or information) to operate or otherwise control the actuators 241-248 of the well construction equipment. Equipment controllers within the scope of the present disclosure can include, for example, microprocessor-based computers (PCs), programmable logic controllers (PLCs), industrial computers (IPCs), soft PLCs, variable frequency drives (VFDs) and/or other controllers or processing devices operable to store and execute program code instructions, receive sensor data, and output control data to cause operation of the well construction equipment based on the program code instructions, sensor data, and/or control data.

The well construction system 100 may comprise a power manager 262 (e.g., a processing device, a computer, a controller, any form of micro processing device, or plurality of aforementioned devices, etc.) operable to receive and store machine-readable and executable program code instructions on a data storage device and then execute such program code instructions to run, operate, or perform a power management (or control) process operable to monitor and control the PS system 218 of the well construction system 100. The program code instructions forming the basis for the power manager 262 described herein may comprise or be based on, for example, optimal efficiency performance curves or data of the various pieces of equipment forming the PS system 218. The power manager 262 may operate to monitor and control electrical power generation and distribution performed by the PS system 218. The power manager 262 may be communicatively connected directly or indirectly with the PS system 218 and operable to control operations of the PS system 218. The power manager 262 may also be communicatively connected with the central controller 192. Therefore, the power manager 262 may be directly communicatively connected with the PS system 218 (e.g., via the communication network 209) or the power manager 262 may be indirectly communicatively connected with the PS system 218 via the central controller 192. A direct communicative connection within the scope of the present disclosure may refer to communication of data between communicating devices (e.g., the power manager 262 and the PS system 218) along a communication path that does not process (e.g., analyze) the data. Such direct communication path may contain intermediate communication devices (e.g., connectors, relays, amplifiers, switches, remote input/output devices, etc.) that receive and output the data, but do not process the data. An indirect communicative connection within the scope of the present disclosure may refer to communication of data between communicating devices (e.g., the power manager 262 and the PS system 218) along a communication path containing an intermediate processing device (e.g., a PC, a PLC, an equipment controller, any form of microprocessor based controller, or plurality of aforementioned devices, etc.) that receives the data, processes the data, and outputs the processed data. Thus, an indirect communicative connection may refer to communication of data between communicating devices via an intermediate processing device located along a communication path between the communicating devices.

The power manager 262 may receive and process (i.e., analyze) sensor data from the sensors 238 according to the program code instructions to monitor performance of the PS system 218 and output control data (i.e., power management control data) to operate or otherwise control the actuators 248 of the PS system 218, thereby controlling operations of the PS system 218. The power manager 262 may output the control data directly to the actuators 248 to control the generation and distribution of electrical power. The power manager 262 may also or instead output the control data to one or more local controllers 228, wherein each of the local controllers 228 may then output the control data to the actuators 248 of the PS system 218 to control a portion of the power generation and distribution operations performed by the PS system 218. The power manager 262 may also or instead output control data to the actuators 248 and/or one or more local controllers 228 via the central controller 192. The electrical actuators 248 may comprise one or more of electrical motors, linear actuators, magnetic coils, switches, and relays, among other examples. The power manager 262 may also be operable to exchange (i.e., output and receive) control data and/or sensor data with the central controller 192 and, thus, collectively operate with the central controller 192 to control operation of the PS system 218. For example, the power manager 262 may receive control data generated by one or more of the processes (e.g., the control process 250) executed by the central controller 192 and output power management control data based on the power management process executed by the power manager 262 and based on the control data from the central controller 192 to control operation of the PS system 218.

The rig control system 200 may comprise a data storage device operable to receive and store a well construction plan 252 (or drilling plan) for drilling and/or otherwise constructing a planned well. The well construction plan 252 may include well specifications, operational parameters, and other information indicative of the planned well and the well construction equipment of the well construction system 100. For example, the well construction plan 252 may include properties of the subterranean formation through which the planned well is to be drilled and otherwise constructed, the path (e.g., direction, curvature, orientation, etc.) along which the planned well is to be formed through the formation, the depth (e.g., true vertical depth (TVD) and/or measured depth (MD)) of the planned well, operational specifications (e.g., power output, weight, torque capabilities, speed capabilities, dimensions, size, etc.) of the well construction equipment (e.g., top drive, mud pumps, 144, downhole mud motor 184, etc.) that is planned to be used to construct the planned well, and/or specifications (e.g., diameter, length, weight, etc.) of tubulars (e.g., drill pipe) that are planned to be used to construct the planned well. The well construction plan 252 may include knowledge (e.g., efficiency of various parameters) learned from offset wells that have been drilled. Optimal parameters associated with the offset wells may then be used as the recommended parameters in a current well construction plan 252. The knowledge learned from the offset wells, including operation limits, such as maximum WOB, top drive speed (RPM), ROP, and/or tripping speed versus depth, may be applied and used as an operation limit within the well construction plan 252.

The well construction plan 252 may further include well construction operations schedule (e.g., order and/or time of well constriction operations) for a plurality of planned well construction tasks (i.e., well construction objectives) that are intended to be achieved to complete the well construction plan 252. Each planned task may comprise a plurality of operational sequences and may be performed by the well construction equipment to construct the planned well. A planned task may be or comprise drilling a predetermined portion or depth of the planned well, completing a predetermined portion or stage of drilling operations, drilling through a predetermined section of the subterranean formation, and performing a predetermined plurality of operational sequences, among other examples. Each operational sequence may comprise a plurality or sequence of physical (i.e., mechanical) operations (i.e., actions) performed by various pieces of well construction equipment. Example operational sequences may include operations of one or more pieces of the well construction equipment of the well construction system 100 described above in association with FIG. 1.

The well construction plan 252 may further include planned operational parameters of the well construction equipment during each planned stage, portion, sequence, task, and/or operation of the well construction operations, such as WOB, RPM, and ROP as a function of wellbore depth. The well construction plan 252 may further include a planned electrical power demand profile (or schedule) indicative of electrical power demand for performing or otherwise associated with each planned stage, portion, sequence, task, and/or operation of the well construction operations contained in the well construction plan 252. Thus, the planned electrical power demand profile may be or comprise a schedule (e.g., sequence or order) of expected electrical power demand levels for predetermined pieces of well construction equipment that are to be met to perform each planned stage, portion, sequence, task, and/or operation of the well construction operations. The planned electrical power demand profile may comprise information indicative of planned generation and/or distribution of electrical power generated by one or more pieces of electrical power generating equipment of the PS system 218 to the various well construction equipment of the well construction system 100, including the well construction equipment of the subsystems 211-218, such as to facilitate performance of the well construction operations pursuant to the well construction plan 252.

The information forming or otherwise from the well construction plan 252 may originate or be delivered in a paper form, whereby the rig personnel manually input such information into the data storage device containing the well construction plan 252. However, the information forming the well construction plan 252 may originate or be delivered in digital format, such that it can be directly loaded to or saved by the data storage device or plurality of data storage devices. The data storage device, or plurality of data storage devices, containing the well construction plan 252 may be communicatively connected to the central controller 192 and/or the power manager 262 such that the central controller 192 and/or the power manager 262 can receive and process (or analyze) the well construction plan 252. The well construction plan 252 may be analyzed programmatically by the central controller 192 and/or the power manager 262 without human intervention. The data storage device storing the well construction plan 252 may be directly or indirectly communicatively connected with the central controller 192 and the power manager 262. The data storage device storing the well construction plan 252 may instead be or form a portion of the central controller 192. The central controller 192 and/or the power manager 262 may analyze the well construction plan 252 and generate or output control data to the local controllers 221-228 or directly to the actuators 241-248 to control the well construction equipment to cause, facilitate, or otherwise implement one or more aspects of methods and operations described herein.

An equipment controller of the rig control system 200 for controlling the well construction system 100 may be operable to automate the well construction equipment to perform well construction operations and change such well construction operations as operational parameters of the well construction operations change and/or when an abnormal event (e.g., state, condition, etc.) is detected during the well construction operations. An equipment controller may be operable to detect an abnormal event based on the sensor data received from the sensors 231-238 and cause the predetermined operations to be performed or otherwise implemented to stop or mitigate the abnormal event or otherwise in response to the abnormal event, without manual control of the well construction equipment by the rig personnel via the control workstation 197. For example, an equipment controller may be operable to make decisions related to selection of actions or sequences of operations that are to be implemented during the well construction operations and/or the manner (e.g., speed, torque, mechanical power, electrical power, etc.) in which such selected operational sequences are to be implemented to stop or mitigate a detected abnormal event. An equipment controller may be further operable to receive and store information that may be analyzed by the control process 250 to facilitate the equipment controller to detect the abnormal event, and select and implement the operational sequences to stop or mitigate the abnormal event.

The central controller 192 may be operable to receive and store machine-readable and executable program code instructions on a data storage device and then execute such program code instructions to run, operate, or perform an abnormal event detector 254 (e.g., an abnormal event detecting computer process), which may be operable to analyze or otherwise process the sensor data received from the sensors 231-238 and detect an abnormal event (e.g., status, condition, etc.) experienced by or otherwise associated with one or more pieces of well construction equipment, and/or an abnormal event experienced by or otherwise associated with a wellbore (e.g., the wellbore 102 shown in FIG. 1). The abnormal event detector 254 may be operable to detect the abnormal events based on the sensor data and output abnormal event data indicative of the detected abnormal event. One or more of the local controllers 221-228 may also execute program code instructions to execute a corresponding abnormal event detector 254 to detect a local abnormal event. The local controllers 221-228 may then transmit data indicative of the local abnormal event to the central controller 192 for analysis. One or more of the processes of the central controller 192 may then re-plan well construction tasks, operational sequences, and other processes based on the detected abnormal events or otherwise based on the condition of the well and/or the well construction equipment.

For example, an abnormal event may be or comprise an abnormal operational surface event experienced by surface equipment (e.g., the surface equipment 110 shown in FIG. 1) and/or an abnormal operational downhole event experienced by a drill string (e.g., the drill string 120 shown in FIG. 1). An example abnormal operational downhole event may include stick-slip, axial vibrations, lateral vibrations, rotational vibrations, and stuck drill pipe. The abnormal event may instead be or comprise an abnormal downhole fluid event experienced by a downhole fluid, such as wellbore fluid (e.g., drilling fluid, formation fluid, fracturing fluid, etc.) within the wellbore, and/or formation fluid within a subterranean formation (e.g., the subterranean formation 106 shown in FIG. 1) through which the wellbore extends. An example abnormal downhole fluid event may include underpressure of the formation fluid, overpressure of the formation fluid, gains of the wellbore fluid, and losses of the wellbore fluid.

The central controller 192 may be operable to receive and store machine-readable and executable program code instructions on a data storage device and then execute such program code instructions to run, operate, or perform an operational state detector 256 (e.g., an operational state detecting computer process), which may be operable to analyze or otherwise process the sensor data received from the sensors 231-238 and detect a state (e.g., a status, a stage, etc.) of the well construction operations that the well construction system 100 is performing. The operational state detector 256 may then output operational state data indicative of the operational state of the well construction system 100. Operational states of the well construction system 100 may comprise, for example, drilling, tripping, circulating, and reaming, among others.

The central controller 192 may be operable to receive and store machine-readable and executable program code instructions on a data storage device and then execute the program code instructions to run, operate, or perform an operational sequence selector 258 (e.g., an operational sequence selecting computer process) operable to select and output an operational sequence (e.g., a plurality or series of physical or mechanical operations, actions, or movements) and an electrical power demand profile associated with the selected operational sequence to be performed by the well construction equipment. Thus, an operational sequence selected by the sequence selector 258 may include or comprise an electrical power demand profile associated with the physical or mechanical operations specified in the selected operational sequence. The operational sequence selector 258 (or generator) may be operable to receive and analyze or otherwise process various data to select (or generate) the operational sequence. For example, the operational sequence selector 258 may be operable to receive and analyze the well construction plan 252, the sensor data from the sensors 231-238, the operational state data from the operational state detector 256, and/or the abnormal event data from the abnormal event detector 254, and select the (e.g., optimal) operational sequence to be performed by the well construction equipment based on such well construction plan 252, sensor data, operational state data, and/or abnormal event data.

The operational sequence selector 258 may be operable to analyze or otherwise process the well construction plan 252 and discretize (e.g., break up or segment) the well construction plan 252 into a plurality of planned tasks or operational sequences that can be implemented (i.e., caused to be performed) by the central controller 192. For example, the operational sequence selector 258 may be operable to analyze or otherwise process the well construction plan 252 and discretize each planned task (e.g., step) defined in the well construction plan 252 into one or more discrete operational sequences that can be received and implemented by the central controller 192. A planned task may include, for example, drilling from depth A to depth B with the set of operation parameters, performing a survey, or performing a telemetry operation. Thus, the operational sequence selector 258 may be operable to select an operational sequence and an associated electrical power demand profile to be performed by the well construction equipment to perform a planned task defined in the well construction plan 252. The central controller 192 and/or the power manager 262 may then receive the selected operational sequence to be performed by the well construction equipment and, based on such selected operational sequence, output control data to cause the well construction equipment to perform the selected operational sequence and, thus, the corresponding planned task. The operational sequence selected and output by the operational sequence selector 258 based on the well construction plan 252 may be referred to hereinafter as a planned operational sequence.

The operational sequence selector 258 may also or instead be operable to analyze or otherwise process the detected abnormal event and select an operational sequence to be performed by the well construction equipment based on such abnormal event to stop or otherwise mitigate the detected abnormal event. The central controller 192 and/or the power manager 262 may then receive the selected operational sequence to be performed by the well construction equipment and, based on such selected operational sequence, output control data to cause the well construction equipment to perform the selected operational sequence, thereby mitigating the abnormal downhole event. The central controller 192 and/or the power manager 262 may cause the well construction equipment to perform the operational sequence selected based on the detected abnormal event while the planned operational sequence is still being performed. However, the central controller 192 and/or the power manager 262 may instead output control data to cause the well construction equipment to stop performing the planned operational sequence, before outputting the control data to cause the well construction equipment to perform the operational sequence selected based on the detected abnormal event. The operational sequence selected and output by the operational sequence selector 258 based on the detected abnormal event may be referred to hereinafter as a mitigating operational sequence.

The rig control system 200 may further comprise a data storage device operable to receive and store a database 260 (e.g., a library) of operational sequences that may be performed by the well construction equipment. Each stored operational sequence may comprise a plurality or series of physical or mechanical operations (e.g., actions, movements, etc.) that may be performed by one or more pieces of the well construction equipment and a corresponding electrical power demand profile associated with each plurality or series of physical or mechanical operations.

Some of the operational sequences (e.g., planned operational sequences) may be performed by corresponding pieces of the well construction equipment to perform a corresponding planned portion of the well construction operations (e.g., to drill a corresponding stage of the planned well). The database 260 may store operational sequences for performing each planned well construction task of the well construction plan 252. The database 260 may store a plurality of alternate operational sequences associated with (i.e., for performing) a planned well construction task or a procedure (e.g., a portion of a well construction task comprising a plurality of mechanical operations) to be performed by the well construction equipment, such as when a status or certain condition of well construction operations changes. Thus, each well construction task or procedure may be associated with a plurality of different and/or alternate planned operational sequences for performing a planned well construction task or procedure. Accordingly, each planned operational sequence associated with a planned well construction task may comprise a different plurality of actions or movements to be performed by the well construction equipment to perform the planned well construction task or procedure.

Some of the operational sequences (e.g., mitigating operational sequences) may be performed by corresponding pieces of the well construction equipment to stop or otherwise mitigate a detected abnormal event. The database 260 may store a plurality of alternate operational sequences associated with (i.e., for performing) various types and/or levels of abnormal events that can take place during well construction operations. For each abnormal event, one or more operational sequences may be defined in association with corresponding priority and/or decision making steps, and saved in the database 260 and/or as part of the operational sequence selector 258. The operational sequence selector 258 may automatically select one or more of the most responsive or optimal operational sequences based on parameters (e.g., type, severity, duration of time, etc.) of the abnormal event. Some abnormal events may be associated with a plurality of different and/or alternate planned operational sequences for performing a planned well construction task or procedure while stopping or otherwise mitigating the detected abnormal event and/or the effects of the detected abnormal event. Some abnormal events may be associated with a plurality of different and/or alternate planned operational sequences that are performed to stop or otherwise mitigate the detected abnormal event after a previously selected planned operational sequence is stopped. Thus, each mitigating operational sequence associated with a different abnormal event may comprise a different plurality of actions or movements to be performed by the well construction equipment to stop or otherwise mitigate the detected abnormal event. Thus, when an abnormal event is detected, the central controller 192 and/or the power manager 262 may stop performance of a previously selected planned operational sequence, the operational sequence selector 258 may select a mitigating operational sequence based on the detected abnormal event, and the central controller 192 and/or the power manager 262 may output control data to cause the well construction equipment to perform the selected mitigating operational sequence, thereby mitigating the abnormal downhole event without manual control of the well construction equipment by the rig personnel via the control workstation 197.

The data storage device containing the database 260 may be communicatively connected to the central controller 192 and/or the power manager 262 such that the central controller 192 and/or the power manager 262 can receive and process (or analyze) the database 260. The data storage device storing the database 260 may be stored on a data storage device external from the central controller 192 and directly or indirectly communicatively connected with the central controller 192. The data storage device storing the database 260 may instead be or form a portion of the central controller 192. For example, the database 260 may be stored on a data storage device (e.g., a memory chip) of the central controller 192 that is different from the data storage device on which the executable program code instructions for the control process 250 and/or the operational sequence selector 258 are stored. The database 260 may also or instead be stored on the same data storage device that stores the executable program code instructions for the control process 250 and/or the operational sequence selector 258. The database 260 may be or form a portion of the operational sequence selector 258 or the operational sequence selector 258 may have access to the planned and mitigating operational sequences stored in the database 260. Therefore, the operational sequence selector 258 may be operable to select from the database 260 an operational sequence to be performed by the well construction equipment.

The central controller 192 and/or the power manager 262 may be operable to receive a selected operational sequence from the sequence selector 258 and automatically operate the well construction equipment accordingly to implement the selected operational sequence. For example, if the selected operational sequence is to trip in a stand within a particular tripping speed, with the pump turned off, the central controller 192 can ensure that the pump is turned off and that the drawworks 118 is running at an intended speed, and the power manager 262 can ensure that the PS system 218 outputs sufficient electrical power to operate the drawworks 118 and does so at optimal energy efficiency. If the selected operational sequence is to trip in a drill string from depth A to depth B, which may mandate the well construction system 100 to run multiple stands automatically, the control process can automatically manage and synchronize multiple pieces of well construction equipment, including tripping, setting slips, breaking connections, picking up a new stand, making connections, releasing slips, and tripping in, without manual control of the well construction equipment by the rig personnel via the control workstation 197.

The power manager 262 may be communicatively connected with the PS system 218. For example, the power manager 262 may be directly communicatively connected with each local controller 228 of the PS system 218, such as via the communication network 209. The power manager 262 may instead be indirectly communicatively connected with each local controller 228 of the PS system 218 via the central controller 192. The power manager 262 may be designed as part of the well construction system 100 (or drill rig) before the well construction system 100 is constructed and installed or otherwise implemented as part of the well construction system 100 while the well construction system 100 is being constructed. However, the power manager 262 may be retrofitted (or added) into a fully constructed and operational well construction system 100 after the well construction system 100 is constructed. The power manager 262 may be configured to communicate with the central controller 192 and/or the equipment of the PS system 218, including with the central controller 192 and/or the equipment of the PS system 218 utilizing a communication protocol that is different from the communication protocol utilized by the power manager 262. Thus, the power manager 262 may be installed on or integrated with well construction systems constructed by different manufacturers. The power manager 262 may be physically installed or installable within the control center 190. However, the power manager 262 may instead be installed or installable at a different location of the well construction system 100 or at a location remote from the well construction system 100. Communication between the power manager 262 and the central controller 192 and/or PS system 218 may be via wired and/or wireless (e.g., Wi-Fi) communication means.

The power manager 262 may be operable to automate selected well construction operations of the well construction rig and, thus, cause the selected well construction operations to be performed without manual control of the well construction equipment by the rig personnel (e.g., the driller) via the rig control workstation 197. The power manager 262 may be operable to make decisions related to selection of actions or sequences of operations that are to be implemented during the well construction operations and/or the manner in which such selected operations are to be implemented.

The power manager 262 may be communicatively connected with an HMI 264 (or a plurality of HMIs) usable by the rig personnel to monitor and control the power manager 262 to monitor and control the well construction equipment of the well construction system 100. The HMI 264 may be communicatively connected with the power manager 262 and operable for entering or otherwise communicating control data to the power manager 262 by the rig personnel for controlling the power manager 262 and the PS system 218. The HMI 264 may be further operable for displaying or otherwise communicating sensor data and other information from the power manager 262 to the rig personnel, thereby permitting the rig personnel to monitor the power manager 262 and the PS system 218. For example, the HMI 264 may be operable to display to the rig personnel the current operational status of the well construction equipment of the PS system 218. The HMI 264 may be or comprise a control workstation, a terminal, a computer, or other device comprising one or more input devices (e.g., a keyboard, a mouse, a joystick, a touchscreen, etc.) and one or more output devices (e.g., a video monitor, a touchscreen, a printer, audio speakers, etc.). The HMI 264 may be physically installable in association with the control workstation 197 of the well construction system 100, such as may permit the rig personnel using the control workstation 197 to also use the HMI 264. However, the HMI 264 may instead be disposed at a different location of the well construction system 100 or at a location remote from the well construction system 100. The HMI 264 may also include, but not limited to, the utilization of existing rig HMIs (or plurality of existing rig HMIs) configured to function in conjunction with the HMI 264 that is specifically designed and developed to interface to the power management system 262. Communication between the HMI 264 and the power manager 262 may be via wired and/or wireless (e.g., Wi-Fi) communication means.

On most drilling rigs, there are two electrical buses (or conductors) where electrical power is managed, a direct-current (DC) electrical power bus and an alternating-current (AC) electrical power bus. Electrical power equipment (i.e., electrical power sources) available at a drilling rig may be managed independently directly through the AC electrical power bus. The present disclosure is directed to a power manager (or power management controller) operable to manage various electrical power equipment of a PS system electrically connected to the main (or primary) AC electrical power bus of a well construction system. The power manager may be a PC, a PLC or equivalent (e.g. a dedicated control system (DCS), a supervisory control and data acquisition (SCADA), etc.), or a combination of the aforementioned devices.

Execution of desired output(s) to achieve optimal AC power management (or control) by the power manager may be accomplished using various inputs, such as feedback devices, sensors, equipment, and data and/or information from data sources. Such inputs may be connected or interfaced via hardwire, fiber optic, and/or wirelessly to: one or more controller math, power, or equivalent processing modules; mathematical, power, and statistical analysis algorithms, programs, or subroutines nested within a controller; and/or commercially available power analysis programs (e.g., including but not limited to PSIM, MS Excel, E-Tap, etc.) nested within one or more controllers and/or other algorithms, programs, or modules suitable for the analysis of data. Calculation results that identify optimal control will generate appropriate control outputs, which may be managed via the power manager to electrical power and/or other energy sources of a well construction system at a wellsite, which may include, for example, engine/generator units (e.g., diesel, hydrogen mix diesel, natural gas or diesel/natural gas blend (DGB/DGE), etc.), gas turbines, an electrical power grid (e.g., hi-line power), electrical energy storage via battery, capacitors, ultra-capacitors, or equivalent energy storage devices, solar-generated electrical power, regenerative electrical power, and thermal generated electrical energy.

Figure 3:
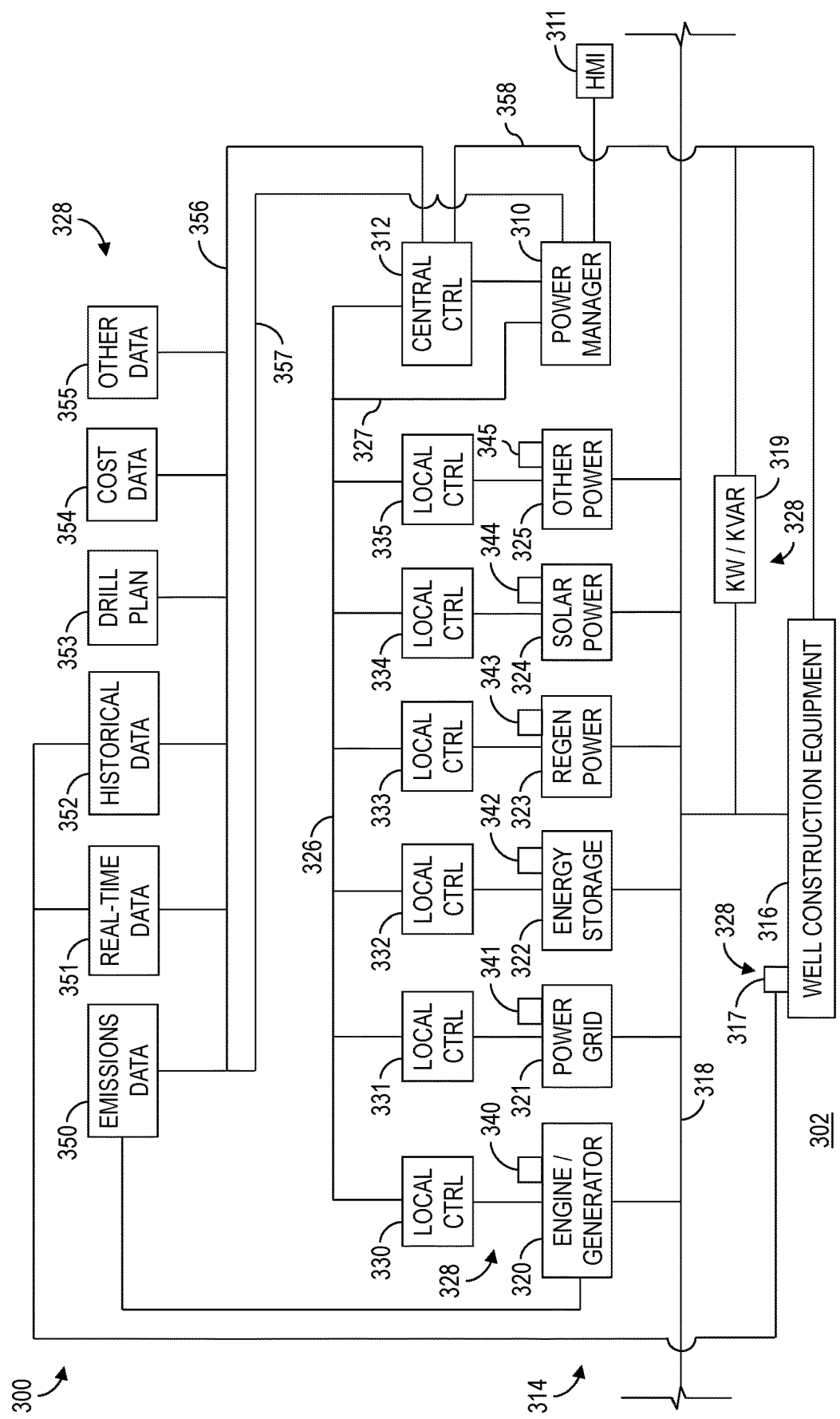
FIG. 3 is a schematic view of at least a portion of an example implementation of apparatus according to one or more aspects of the present disclosure.

FIG. 3 is a schematic view of an example implementations of a well construction system 300 according to one or more aspects of the present disclosure. The well construction system 300 may be an example implementation of and comprise one or more features and/or modes of operation of the well construction system 100 shown in FIG. 1. For example, the well construction system 300 comprises one or more of a power manager 310, a central controller 312, and a PS system 314, each being an example implementation of and comprising one or more features and/or modes of operation of the power manager 262, the central controller 192, and the PS system 218, respectively, shown in FIGS. 1 and 2. Accordingly, the following description refers to FIGS. 1-3, collectively.

The well construction system 300 may be located at a wellsite 302 and comprise well construction equipment 316 (e.g., the equipment subsystems 211-217 shown in FIG. 2) operable to perform well construction operations to construct (e.g., drill) a well 102. The PS system 314 may be or comprise a plurality of electrical power supply equipment 320-325 (hereinafter "power equipment") operable to supply electrical power to the well construction equipment 316 to permit the well construction equipment 316 to perform the well construction operations described herein. The power equipment 320-325 of the PS system 314 may comprise a plurality of electrical power sources, including one or more combustion engine/electrical power generator units 320 (hereinafter "generator units"), an electrical power grid 321, one or more electrical energy storage units 322 (hereinafter "storage units"), one or more electrical power regeneration units 323 (hereinafter "regen units"), one or more solar/electrical power generation units 324 (hereinafter "solar power units"), and/or other electrical power sources 325 (e.g., wind turbine power). The power equipment 320-325 may be electrically connected to the well construction equipment 316 via an electrical power bus 318 (hereinafter "bus") operable to transmit electrical power from the power equipment 320-325 to the well construction equipment 316 to thereby permit the well construction equipment 316 to perform the well construction operations. The bus 318 may be or comprise an electrical power supply line (e.g., 600 Volt/60 Hertz main line or bus, but not limited to 600 Volt/60 Hertz) electrically connected to an electrical output of each piece of the power equipment 320-325.

The well construction system 300 may further comprise a plurality of operational data sources 328 operable to output operational data indicative of or otherwise associated with various operational aspects of the well construction system 300 and/or well construction operations performed by the well construction equipment 316. The central controller 312 may be communicatively connected with the well construction equipment 316, the power equipment 320-325 of the PS system 314, and the operational data sources 328. The central controller 312 may comprise a processor and a memory storing a computer program code that, when executed by the processor of the central controller 312, may cause the central controller 312 to receive and process (or analyze) the operational data and output well construction control data (or commands) to the well construction equipment 316 based on the operational data to cause the well construction equipment 316 to perform the well construction operations described herein.

The power manager 310 may be communicatively connected with the power equipment 320-325 and the operational data sources 328. The power manager 310 may comprise a processor and a memory storing a computer program code that, when executed by the processor of the power manager 310, may cause the power manager 310 to receive and process (or analyze) the operational data and output power control data based on the operational data to cause the power equipment 320-325 to perform power management operations described herein. For example, the power control data may control the power equipment 320-325 to thereby control the electrical power being supplied by the power equipment 320-325 to the well construction equipment 316 via the bus 318 during the well construction operations. The power manager 310 may be communicatively connected with the central controller 312. For example, the power manager 310 may be interfaced directly with the central controller 312 via direct communication interface or hardwire signals. The central controller 312 may be communicatively connected directly with one or more of the operational data sources 328 via corresponding communication conductors (or networks). The power manager 310 may be communicatively connected directly with one or more of the operational data sources 328 via corresponding communication conductors (or networks). The power manager 310 may also or instead be communicatively connected indirectly with one or more of the operational data sources 328 via the central controller 312.

The operational data sources 328 may be or comprise data storage devices 350-355 storing various operational data generated at or by the well construction system 300 and/or operational data generated for use by the power manager 310. The data storage devices 350-355 may each be or comprise a volatile memory device and/or a tangible, non-transitory data storage medium. One or more of the data storage devices 350-355 may be located at the wellsite 302. For example, one or more of the data storage devices 350-355 may be located within the control center 190 and/or form a portion of the rig control system 200 described above and shown in FIG. 2. However, one or more of the data storage devices 350-355 may instead be located remote from the wellsite 302. Although the data storage devices 350-355 are shown as separate and discrete devices, it is to be understood that the data storage devices 350-355 may be separate partitions of the same data storage device, separate virtual locations (e.g., folders) of the same data storage device, or otherwise implemented as part of the same data storage device. The data storage devices 350-355 may be communicatively connected with the central controller 312 directly via communication conductors 356 (e.g., a network or a plurality of networks) configured to communicate the stored operational data to the power manager 310. The conductors 356 may be or comprise a portion of the communication network 209 shown in FIG. 2. The data storage devices 350-355 may be communicatively connected with the power manager 310 indirectly via the central controller 312.

The operational data stored on the data storage device 350 may be or comprise emissions sensor data indicative of characteristics of emissions discharged by the generator units 320. The operational data stored on the data storage devices 351, 352, may be or comprise real-time and historical well construction equipment sensor data indicative of real-time and historical operational parameters of the well construction equipment 316, such as generator unit fuel consumption, fuel rate, exhaust temperatures, and power flow, among other examples. The operational data stored on the data storage device 353 may be or comprise a well construction plan for drilling and/or otherwise constructing a planned well, and may include well specifications, operational parameters, and other information indicative of the planned well and the well construction equipment of the well construction system 300. The well construction plan stored on the data storage device 353 may be or comprise the well construction plan 252 described above and shown in FIG. 2. The data storage device 354 may store energy cost data indicative of cost of various raw sources of energy used by the power equipment 320-325 to generate or otherwise output electrical power. For example, the energy cost data may include current and/or forecasted cost of fuel (e.g., gasoline, diesel fuel, natural gas, hydrogen, etc.) for operating the generator units 320 and/or current and/or forecasted cost of electrical power supplied by an electrical utility company to or via the electrical power grid 321. The data storage device 355 may store other data and/or provide access to cloud computing services (or cloud based analytics) that can receive data from or generated by the well construction system 300, process such data, and output operational data for use by the power manager 310. The data storage device 355 may thus be or form a portion of a remote server operable to execute service provider tools and/or other remote applications operable to output operational data for use by the power manager 310.

The operational data sources 328 may further comprise well construction equipment sensors 317 associated with the well construction equipment 316. The operational data output by the well construction equipment sensors 317 may be or comprise real-time well construction equipment sensor data indicative of operational status of the well construction equipment 316. The well construction equipment sensor data may be stored on the data storage device 351 in real-time and be transmitted to the power manager 310 in real-time via the conductors 356 while the well construction equipment sensor data is stored on the data storage device 351. Historical well construction equipment sensor data from historical (i.e., previous) well construction operations performed by the well construction system 300 at the wellsite 302 or from historical well construction operations performed by the well construction system 300 at a different wellsite may be stored on the data storage device 352. The historical well construction equipment sensor data may be transmitted to or received by the power manager 310 via the conductors 356. The power manager 310 may receive and process the operational data from the data storage devices 351, 352 and then output control data to various power equipment 320-325 to control the power equipment 320-325 based on the operational data, including to control generation and distribution of electrical power to the bus 318 by the power equipment 320-325. For example, the power manager 310 may control generation and distribution of electrical power to the bus 318 by the power equipment 320-325 based on the most efficient sources of power available, taking into consideration directives to reduce total fuel consumption, reduce wear and tear on the power equipment 320-325, and reduce emissions into the local environment.

The well construction equipment sensors 317 may include sensors utilized for operation of the various subsystems 211-217 of the well construction system 300 and may be or comprise the sensors 231-237, as described above and shown in FIG. 2. For example, the well construction equipment sensors 317 may include cameras, position sensors, speed sensors, acceleration sensors, pressure sensors, force sensors, temperature sensors, flow rate sensors, vibration sensors, electrical current sensors, electrical voltage sensors, resistance sensors, gesture detection sensors or devices, voice actuated or recognition devices or sensors, chemical sensors, exhaust sensors, and/or other examples. The well construction equipment sensor data may include signals, information, and/or measurements indicative of equipment operational status (e.g., on or off, percent load, up or down, set or released, etc.), drilling parameters (e.g., depth, hook load, torque, etc.), auxiliary parameters (e.g., vibration data of a pump), flow rate, temperature, operational speed, position, and pressure, among other examples. The acquired well construction equipment sensor data may include or be associated with a timestamp (e.g., date and/or time) indicative of when the sensor data has been acquired. The well construction equipment sensor data may also or instead be aligned with a depth or other drilling parameter.

The operational data sources 328 may further comprise one or more electrical power bus sensors 319 associated with the bus 318. The operational data output by the electrical power bus sensor 319 may be or comprise electrical power bus sensor data indicative of properties of the electrical power transmitted through the bus 318. The electrical power bus sensor 319 may be electrically connected to or along the bus 318 or otherwise between the bus 318 and the well construction equipment 316. The electrical power bus sensor 319 may be or comprise one or more kilowatt/kilovolt-amperes reactive (kW/kVAR) transducers. The electrical power bus sensor 319 may output electrical power bus sensor data indicative of various electrical properties (e.g., voltage, current, real and reactive electrical power, total electrical power demand, etc.) of the electrical power supplied to the bus 318 by the power equipment 320-325 and/or electrical power demand via the bus 318 by the well construction equipment 316. The electrical power bus sensor 319 may be communicatively connected with the central controller 312 directly via communication conductors (or network) 358 configured to communicate the electrical power bus sensor data to the central controller 312. The conductors 358 may be or comprise a portion of the communication network 209 shown in FIG. 2. The electrical power bus sensor 319 may be communicatively connected with the power manager 310 indirectly via the central controller 312. The power manager 310 may receive and process the electrical power bus sensor data and, thus, monitor or measure the electrical properties of the electrical power made available by the power equipment 320-325 to the well construction equipment 316 based on the electrical power bus sensor data and other data. The power manager 310 may then output control data to various power equipment 320-325 to control the power equipment 320-325 based on the electrical power bus sensor data, including to control generation and distribution of electrical power to the bus 318 by the power equipment 320-325.

The operational data sources 328 may also comprise power equipment sensors 340-345 associated with the power equipment 320-325. The power equipment sensors 340-345 may be or comprise the sensors 238 described above and shown in FIG. 2. The power equipment sensors 340-345 may be or comprise, for example, power monitoring devices (e.g., power quality meters, power analyzers, PLC power analyzer modules, kW/kVAR transducers, current transfomlers (CTs), Potential Transfomlers (PTs), etc.). The operational data output by the power equipment sensors 340-345 may be or comprise power equipment sensor data (e.g., feedback data) indicative of operational status of the power equipment 320-325. The power manager 310 may receive and process the power equipment sensor data from the power equipment sensors 340-345 to permit the power manager 310 to monitor operational status of the power equipment 320-325. The power manager 310 may then output power equipment control data (e.g., control commands) to the power equipment 320-325 to permit the power manager 310 to control the power equipment 320-325 based on the power equipment sensor data.

The power equipment 320-325 (and the power equipment sensors 340-345) may be communicatively connected with the central controller 312 directly via communication conductors 326 (e.g., a network or plurality of networks) configured to communicate the power equipment sensor data. The conductors 326 may be or comprise a portion of the communication network 209 shown in FIG. 2. The power equipment 320-325 may be communicatively connected with the power manager 310 indirectly via the central controller 312. However, the power equipment 320-325 may also or instead be communicatively connected directly with the power manager 310 via the communication conductors 326 and communication conductors 327. The conductors 327 may be or comprise a portion of the communication network 209 (or a plurality of networks). Each of the power equipment 320-325 may comprise a corresponding local controller 330-335. Thus, the power manager 310 of the well construction system 300 may be interfaced with the local controllers 330-335 directly via the communication conductors 326, 327 and/or indirectly via the communication conductors 326 and the central controller 312 (or a plurality of central controllers). The power manager 310 may receive (or pull) the operational data from the power equipment sensors 340-345 and output power control data directly and/or indirectly to the local controllers 330-335 (or a plurality of local controllers) of the power equipment 320-325 to cause the power equipment 320-325 to perform power generation operations in an optimal or otherwise intended manner.

The power equipment 320-325 of the PS system 314 may comprise, for example, two, three, four, five, six, or more generator units 320. Each generator unit 320 may comprise a combustion engine (e.g., a diesel engine, a diesel/natural gas mixture engine, a gas turbine, a plurality of one or more of the aforementioned equipment, a hybrid combination of the aforementioned equipment, etc.) mechanically connected with and configured to rotate or otherwise actuate an electrical generator to output electrical power to the bus 318. Each generator unit 320 may further comprise a local controller 330 (e.g., one or more PCs, PLCs, DCSs, or combination thereof) comprising various electrical controllers and actuators (e.g., speed controller, voltage controller, electrical connectors, switches, circuit breakers, and/or relays) for controlling operational parameters of the generator unit 320. Each generator unit 320 may also comprise one or more sensors 340 for monitoring operational status of the generator unit 320. Each generator unit 320 may be communicatively connected (e.g., directly or indirectly via a rig central controller, a generator unit controller, other microprocessor based controller or a plurality of the aforementioned devices) with the power manager 310 to permit control of each generator unit 320, including to control operational status (e.g., on/off status) of each generator unit 320 and/or to control the amount of electrical power that is output by each generator unit 320 to the bus 318 or otherwise made available to the well construction equipment 316 via the bus 318.

The power manager 310 may receive various sensor data (i.e., feedback data) from the generator unit sensors 340, analyze such sensor data, and output control data to the generator units 320 (e.g., directly or indirectly via a rig central controller, a generator unit controller, other microprocessor based controller or a plurality of the aforementioned devices) to control operation of the generator units 320 based on the received sensor data and other data. The sensor data output by the sensors 340 of each generator unit 320 to the power manager 310 may comprise data indicative of, for example, current operational status of the engine and/or the electrical generator, current fault status, current operating speed of the engine and/or the electrical generator, current throttle position of the engine, current engine load (e.g., load percentage with respect to maximum engine load), current electrical power generated, current engine power output, current electrical voltage generated, current electrical current generated, current fuel (e.g., diesel fuel or natural gas) consumption rate (e.g., flow rate) of the engine, current temperature of the engine and/or the electrical generator, and other information the engine/generator manufacturer provides via existing equipment or via added devices for obtaining salient critical feedback data. The local controller 330 and the sensors 340 may be communicatively connected with the power manager 310 via the conductors 326. The power manager 310 may be operable to monitor operational status of the generator units 320, analyze sensor data from the sensors 340, and output control data to the generator units 320 to control operation of the generator units 320 based in part on the received sensor data. The control data output by the power manager 310 to each generator unit 320 may comprise data indicative of, for example, intended operational status of the engine and/or the electrical generator, intended operating speed of the engine and/or the electrical generator, intended throttle position of the engine, intended engine load, intended electrical power generated, intended engine power output, intended electrical voltage generated, intended electrical current generated, intended fuel consumption rate of the engine, and intended blackout limits.

The sensors 340 may include one or more exhaust sensors (e.g., sniffers) operatively connected with or along an exhaust port of each generator unit 320. The exhaust sensors may be operable to output emissions sensor data (e.g., sensor signals or measurements) indicative of various quantitative and qualitative properties of the exhaust output by the engine of each generator unit 320. The emissions sensor data output by the exhaust sensors may comprise data indicative of, for example, quantity of particulate material (PM), quantity of carbon monoxide (CO), quantity of carbon dioxide ($CO_2$), quantity of nitric oxide ($NO_x$), quantity of nitrogen dioxide ($NO_2$) (collectively referred to hereinafter as "exhaust emissions"), and exhaust temperature. The emissions sensor data may be recorded to the data storage device 350 or other mass data storage device either associated with power manager 320, rig controller 312, historical data 352, other data 355, or a plurality of the aforementioned devices or other equivalent mass data storage devices. The data storage device 350 containing the emissions data may be directly communicatively connected with the power manager 310 via the communication conductor 357 extending between the data storage device 350 and the power manager 310. The data storage device 350 containing the emissions data may also or instead be indirectly communicatively connected with the power manager 310 via the communication conductors 356 and the central controller 312.

The electrical power grid 321 (also referred to as an electrical hi-line) may be or comprise an electrical power distribution unit (e.g., a system, skid, or station) electrically connected with the bus 318. The electrical power grid 321 may be located at the wellsite 302 or at a distance from the wellsite 302. The electrical power grid 321 may comprise an electrical power transformer (e.g., a step-down transformer) operable to step down voltage supplied to the electrical power grid 321. The electrical power grid 321 may comprise an electrical connector (e.g., an electrical switch and/or relay) operable to connect the electrical power transformer (or other portion of the electrical power grid 321) to the bus 318. The electrical power grid 321 may further comprise a local controller 331 comprising various electrical controllers and actuators (e.g., electrical connectors, switches, circuit breakers, power meters, power quality analyzers, and/or relays or plurality of the aforementioned devices) for controlling operational parameters of the electrical power grid 321. The electrical power grid 321 may also comprise one or more sensors 341 for monitoring operational status of the electrical power grid 321. The electrical power grid 321 may be communicatively connected (directly or indirectly) with the power manager 310 to output control data to control operation of the electrical power grid 321, including to control operational status (e.g., on/off status, electrical connection status, etc.) of the electrical power grid 321 and/or to control the amount of electrical power that is output by electrical power grid 321 to the bus 318 or otherwise made available to the well construction equipment 316 via the bus 318. The power manager 310 may receive various sensor data (i.e., feedback data) from the electrical power grid sensors 341, analyze such sensor data, and output control data to the electrical power grid 321 to control operation of the electrical power grid 321 based on the received sensor data and other data.

The storage unit 322 may be operable to selectively receive and store electrical energy generated by the generator units 320, the regen units 323, and the solar power units 324 and/or supplied by the electrical power grid 321 or other available alternative power source, and then selectively output the stored electrical energy to the various electrical actuators of the well construction equipment 316. The storage unit 322 may comprise a plurality of electrical storage devices (e.g., batteries, capacitors) connected in series and in parallel, and collectively operable to store sufficient amount of electrical energy to operate predetermined one or more of the well construction equipment 316 for a predetermined period of time. The storage unit 322 may be operable to store, for example, between about 240 kilowatt-hours and 2.5 megawatt-hour of electrical power. The storage unit 322 may be operable to output the stored electrical energy at maximum rates ranging, for example, between about 250 kilowatts and about 5 megawatts. The storage unit 322 may further comprise a bi-directional inverter operable to change the AC power supplied by the generator units 320 and the electrical power grid 321 to DC power for storage by the electrical storage devices, and change the DC power stored by the electrical storage devices to AC power for use by the well construction equipment 316. The storage unit 322 may further comprise a local controller 332 (or a plurality of controllers, such as battery management system controllers) comprising various electrical controllers and actuators (e.g., electrical connectors, switches, circuit breakers, and/or relays) for controlling operational parameters of the storage unit 322. The storage unit 322 may also comprise one or more sensors 342 for monitoring operational status of the storage unit 322. The electrical energy storage unit 322 may be communicatively connected (directly or indirectly) with the power manager 310, such as may permit the power manager 310 to receive sensor data and output control data to control operation of the storage unit 322, including to control operational status (e.g., on/off status, charge/discharge, rate of charge/discharge, etc.) of each storage unit 322 and/or to control the amount of electrical power that is output to the bus 318 or otherwise made available to the wellsite equipment via the bus 318.

The power manager 310 may receive various sensor data (i.e., feedback data) from the sensors 342 of the storage unit 322, analyze such sensor data, and output control data to the storage unit 322 to control operation of the storage unit 322 based on the received sensor data and other data, such as from the rig equipment (e.g., total rig power demand data), rig controller 312, and/or other data 355. The sensor data output by the sensors 342 of the storage unit 322 to the power manager 310 may comprise data indicative of, for example, current operational status, current fault status, current battery health status, current status of electrical connection with the bus 318, current state of battery charge (e.g., current battery charge percentage with respect to maximum battery capacity), current battery efficiency, current power output (e.g., real and reactive power) to the bus 318, current rate of power storage to the storage device, current AC and DC electrical voltage, current AC and DC electrical current, current AC electrical frequency, quantity of charge cycles, current peak load shaving, current load applied to the engine of the generator units 320, current temperature of the battery and/or the inverter. The control data output by the power manager 310 to the storage unit 322 may comprise data indicative of, for example, intended operational status, intended status of electrical connection with the bus 318, intended battery charge, intended battery efficiency, intended power output to the bus 318, intended AC and DC electrical voltage, intended AC and DC electrical current, intended AC electrical frequency, intended quantity of charge cycles, intended peak load shaving, and intended load to be applied to the engine of the generator units 320.

The storage unit 322 may be selectively electrically connected to the bus 318 by the power manager 310 to thereby selectively permit the power manager 310 to receive and store the electrical power output to the bus 318 by the other power equipment 320, 321, 323-325. The storage unit 322 may be electrically connected to the generator units 320 in parallel, such that the storage unit 322 operates or appears as a load to the generator units 320 when the storage unit 322 is storing electrical power output by the generator units 320. Utilization of the storage unit 322 as a load facilitates a more efficient operation of the engines (e.g., low engine load results in higher fuel consumption and emissions) of the generator units 320. Thus, when one or more of the generator units 320 operate at low efficiency, the storage unit 322 can be operated to a "charge" state to store the electrical energy output by the generator units 320, thereby causing a higher load demand on the generator units 320 that will result in lower fuel consumption and emissions by the engines of the generator units 320 as well as improved work output per gallon of fuel consumed (e.g., kWh/gal). The storage unit 322 may also be selectively operated by the power manager 310 to output the stored electrical energy at a selected rate to the well construction equipment 316 via the bus 318 to provide electrical power to operate the well construction equipment 316 that will permit the rig to shut down generator unit engine operations, such as to eliminate fuel consumption and emissions discharged.

The power equipment of the PS system 314 may comprise, for example, one, two, three, four, or more electrical regen units 323 distributed throughout the well construction system 300. Each regen unit 323 may be or comprise an electrical motor/generator unit or a four (4) quadrant regenerative rectifier unit implemented as an actuator of a piece of well construction equipment 316. An example regen unit 323 may be a motor/generator operable to actuate the drawworks 118 (shown in FIG. 1) for lifting the drill string 120 and individual tubulars 111. During well construction operations, the regen unit 323 may generate electrical power when the drawworks 118 is used to lower the drill string 120 and individual tubulars 111 and the gravitational weight of the drill string 120 and individual tubulars 111 rotate the regen unit 323 to generate electrical power. The electrical power generated by the regen units 323 implemented as part of the well construction equipment 316 may be fed to the bus 318, such as by way of a regenerative rectifier or equivalent regenerative component/device (e.g., active front end or AFE), and used by other well construction equipment 316 or stored in the storage unit 322. Each regen unit 323 may further comprise a local controller 333 comprising various electrical controllers and actuators (e.g., speed controller, voltage controller, electrical connectors, switches, circuit breakers, and/or relays) for controlling operational parameters of the regen unit 323. Each regen unit 323 may also comprise one or more sensors 343 for monitoring operational status of the regen unit 323. Each regen unit 323 may be communicatively connected directly or indirectly (e.g., via an interface to the central controller 312) with the power manager 310, such as may permit the power manager 310 to receive sensor data and output control data to control operation of each regen unit 323, including to control operational status (e.g., on/off status) of each regen unit 323 and/or to control the amount of electrical power that is output by each regen unit 323 to the bus 318 or otherwise made available to the well construction equipment 316 via the bus 318.

The power equipment of the PS system 314 may comprise, for example, one, two, three, four, or more solar power units 324. Each solar power unit 324 may comprise one or more solar panels and an electrical inverter operable to change the DC power generated by the solar panels to AC power for use by the well construction equipment 316. Each solar power unit 324 may further comprise a local controller 334 comprising various electrical controllers and actuators (e.g., speed controller, voltage controller, electrical connectors, switches, circuit breakers, and/or relays) for controlling operational parameters of the solar power unit 324. Each solar power unit 324 may also comprise one or more sensors 344 for monitoring operational status of the solar power unit 324. Each solar power unit 324 may be communicatively connected with the power manager 310, such as may permit the power manager 310 to receive sensor data and output control data to control operation of each solar power unit 324, including to control operational status (e.g., on/off status) of each solar power unit 324 and/or to control the amount of electrical power that is output by each solar power unit 324 to the power bus 318 or otherwise made available to the well construction equipment 316 via the bus 318.

The power equipment of the PS system 314 may also comprise other power sources 325. Each power source 325 (e.g., wind turbines) may further comprise a local controller 335 comprising various electrical controllers and actuators (e.g., speed controller, voltage controller, electrical connectors, switches, circuit breakers, and/or relays) for controlling operational parameters of the power source 325. Each power source 325 may also comprise one or more sensors 345 for monitoring operational status of the power source 325. Each power source 325 may be communicatively connected with the power manager 310, such as may permit the power manager 310 to receive sensor data and output control data to control operation of each power source 325, including to control operational status (e.g., on/off status) of each power source 325 and/or to control the amount of electrical power that is output by each power source 325 to the bus 318 or otherwise made available to the well construction equipment 316 via the bus 318.

The power manager 310 may be communicatively connected with an HMI 311 (or other available HMIs on the rig) usable by a human user (e.g., a driller or other rig personnel) to monitor and control the power manager 310 to thereby monitor and control the power equipment 320-325 of the PS system 314. The HMI 311 may be communicatively connected with the power manager 310 and operable for entering or otherwise communicating control data to the power manager 310 by the human user for controlling the power manager 310 and the power equipment 320-325. For example, the HMI 311 may be usable by the human user to enter a plurality of power management settings into the power manager 310, wherein each power management setting is associated with a corresponding mode of operation of the power manager 310. The HMI 311 may therefore be used to change the mode of operation of the power manager 310 to the mode of operation associated with each power management setting. The HMI 311 may be further operable to display or otherwise communicate sensor data and other information from the power manager 311 to the human user, thereby permitting the human user to monitor the power manager 310 and the power equipment 320-325. For example, the HMI 311 may be operable to display to the human user the current operational status of the power equipment 320-325, including information or recommendations indicative of how efficiently the system is operating versus how it could be operating if changes were made to the equipment operating (e.g., if multiple engines running at low loads HMI 311 could provide feedback on current kWh/gal or cost per kWh with all the engines running at that time and how much more efficient the system would operate if some engines were turned off or power supplemented via alternative power sources 321-325). The HMI 311 may be or comprise a control workstation, a terminal, a computer, other device, or a plurality of the aforementioned devices comprising one or more input devices (e.g., a keyboard, a mouse, a joystick, a touchscreen, etc.) and one or more output devices (e.g., a video monitor, a touchscreen, a printer, audio speakers, etc.). The HMI 311 may be located in association with the control workstation 197 shown in FIGS. 1 and 2, such as may permit the human user using the control workstation 197 to also use the HMI 311. However, the HMI 311 may instead be disposed at a different location of the well construction system 300 or at a location remote from the well construction system 300 and may be incorporated into the rig's existing rig control system. For example, the HMI 311 may be disposed the company man's office or the rig manager's office. Communication between the HMI 311 and the power manager 310 may be via wired and/or wireless (e.g., Wi-Fi) communication means or may be via way of an existing rig control system controller 312 and/or other data (355).

The power manager 262 and the HMI 311 may be designed as part of the well construction system 300 (or drill rig) before the well construction system 300 is constructed and installed or otherwise implemented as part of the well construction system 300 while the well construction system 300 is being constructed. However, the power manager 310 and the HMI 311 may be retrofitted (or added) into a fully constructed and operational well construction system 300 after the well construction system 300 is constructed. The power manager 310 may be communicatively connected with or configured for direct communicative connection with the power equipment 320-325 and the operational data sources 328 via the conductors 326, 356, 357, 358 (e.g., the communication network 209). The power manager 310 may also or instead be communicatively connected with or configured for indirect communicative connection with the power equipment 320-325 and the operational data sources 328 via the central controller 312. The power manager 310 may be configured to communicate with and/or control the power equipment 320-325 and the operational data sources 328, including the power equipment 320-325 and the operational data sources 328 that utilize a communication protocol that is different from the communication protocol utilized by the power manager 310. Thus, the power manager 310 may be installed on or integrated with well construction rigs constructed by different manufacturers. The power manager 310 may be physically installed or installable within the control center 190. However, the power manager 310 may instead be installed or installable at a different location of the well construction system 300 or at a location remote from the well construction system 300.

Figure 4:
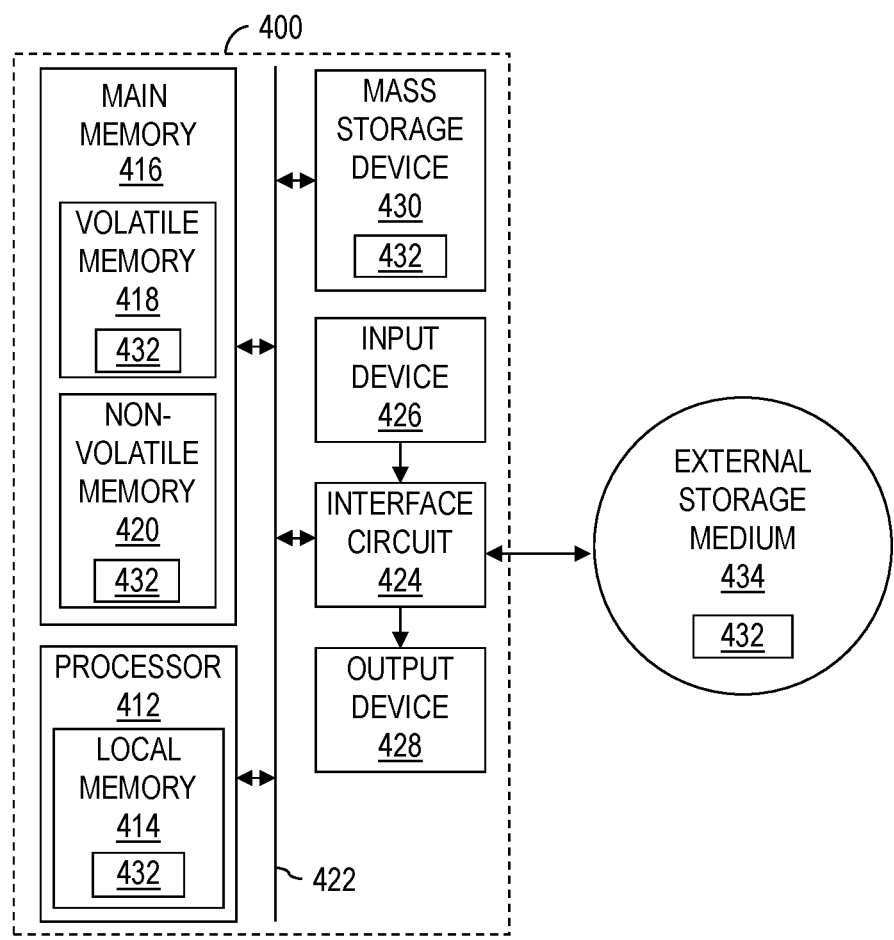
FIG. 4 is a schematic view of at least a portion of an example implementation of apparatus according to one or more aspects of the present disclosure.

FIG. 4 is a schematic view of at least a portion of an example implementation of a processing device 400 (or system) according to one or more aspects of the present disclosure. The processing device 400 may be or form at least a portion of one or more equipment controllers and/or other electronic devices shown in one or more of the FIGS. 1-3. For example, the processing device 400 may be or form at least a portion of one or more of the central controller 192, 312, the power manager 262, 310, the local controllers 221-228, 330-335, and the HMI 264, 311. Accordingly, the following description refers to FIGS. 1-4, collectively.

The processing device 400 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. Although it is possible that the entirety of the processing device 400 is implemented within one device, it is also contemplated that one or more components or functions of the processing device 400 may be implemented across multiple devices, some or an entirety of which may be at the wellsite and/or remote from the wellsite.

The processing device 400 may comprise a processor 412, such as a general-purpose programmable processor. The processor 412 may comprise a local memory 414, and may execute machine-readable and executable program code instructions 432 (i.e., computer program code) present in the local memory 414 and/or other memory device. The processor 412 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 412 include one or more INTEL microprocessors, microcontrollers from the ARM and/or PICO families of microcontrollers, embedded soft/hard processors in one or more FPGAs.

The processor 412 may execute, among other things, the program code instructions 432 and/or other instructions and/or programs to implement the example methods and/or operations described herein. For example, the program code instructions 432, when executed by the processor 412 of the processing device 400, may cause the processor 412 to receive and process (e.g., compare) sensor data (e.g., sensor measurements). The program code instructions 432, when executed by the processor 412 of the processing device 400, may also or instead output control data (i.e., control commands) to cause one or more portions or pieces of well construction equipment (including power equipment) of a well construction system to perform the example methods and/or operations described herein.

The processor 412 may be in communication with a main memory 416, such as may include a volatile memory 418 and a non-volatile memory 420, perhaps via a bus 422 and/or other communication means. The volatile memory 418 may be, comprise, or be implemented by random-access memory (RAM), static RAM (SRAM), dynamic RAM (DRAM), synchronous DRAM (SDRAM), RAMBUS DRAM (RDRAM), and/or other types of RAM devices. The non-volatile memory 420 may be, comprise, or be implemented by read-only memory, flash memory, and/or other types of memory devices. One or more memory controllers (not shown) may control access to the volatile memory 418 and/or non-volatile memory 420.

The processing device 400 may also comprise an interface circuit 424, which is in communication with the processor 412, such as via the bus 422. The interface circuit 424 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 424 may comprise a graphics driver card. The interface circuit 424 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 400 may be in communication with various sensors, video cameras, actuators, processing devices, equipment controllers, and other devices of the well construction system via the interface circuit 424. The interface circuit 424 can facilitate communications between the processing device 400 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or other communication protocol.

One or more input devices 426 may also be connected to the interface circuit 424. The input devices 426 may permit a human user to enter the program code instructions 432, which may be or comprise control data, operational parameters, operational set-points, a well construction plan, and/or a database of operational sequences. The program code instructions 432 may further comprise modeling or predictive routines, equations, algorithms, processes, applications, and/or other programs operable to perform example methods and/or operations described herein. The input devices 426 may be, comprise, or be implemented by a keyboard, a mouse, a joystick, a touchscreen, a track-pad, a trackball, an isopoint, and/or a voice recognition system, among other examples. One or more output devices 428 may also be connected to the interface circuit 424. The output devices 428 may permit visualization or other sensory perception of various data, such as sensor data, status data, and/or other example data. The output devices 428 may be, comprise, or be implemented by video output devices (e.g., a liquid crystal display (LCD), a light-emitting diode (LED) display, a cathode ray tube (CRT) display, a touchscreen, etc.), printers, and/or speakers, among other examples. The one or more input devices 426 and the one or more output devices 428 connected to the interface circuit 424 may, at least in part, facilitate the HMIs described herein.

The processing device 400 may comprise a mass storage device 430 for storing data and program code instructions 432. The mass storage device 430 may be connected to the processor 412, such as via the bus 422. The mass storage device 430 may be or comprise a tangible, non-transitory storage medium, such as a floppy disk drive, a hard disk drive, a compact disk (CD) drive, and/or digital versatile disk (DVD) drive, among other examples. The processing device 400 may be communicatively connected with an external storage medium 434 via the interface circuit 424. The external storage medium 434 may be or comprise a removable storage medium (e.g., a CD or DVD), such as may be operable to store data and program code instructions 432.

As described above, the program code instructions 432 may be stored in the mass storage device 430, the main memory 416, the local memory 414, and/or the removable storage medium 434. Thus, the processing device 400 may be implemented in accordance with hardware (perhaps implemented in one or more chips including an integrated circuit, such as an ASIC), or may be implemented as software or firmware for execution by the processor 412. In the case of firmware or software, the implementation may be provided as a computer program product including a non-transitory, computer-readable medium or storage structure embodying computer program code instructions 432 (i.e., software or firmware) thereon for execution by the processor 412. The program code instructions 432 may include program instructions or computer program code that, when executed by the processor 412, may perform and/or cause performance of example methods, processes, and/or operations described herein.

The present disclosure is further directed to methods (e.g., operations and/or processes) for monitoring and controlling individual and collective operation of the power equipment 320-325 at a wellsite 302 to optimize the individual and/or collective operation of such power equipment 320-325 to thereby optimize well construction and/or other operations at the wellsite 302. The methods may be performed by utilizing (or otherwise in conjunction with) at least a portion of one or more implementations of one or more instances of the apparatus shown in one or more of FIGS. 1-4, and/or otherwise within the scope of the present disclosure. The methods may be caused to be performed, at least partially, by a controller (e.g., the control device 400, the power manager 262, 310, etc.) executing computer program code according to one or more aspects of the present disclosure. Thus, the present disclosure is also directed to a non-transitory, computer-readable medium comprising computer program code that, when executed by the controller, may cause such controller to perform the example methods described herein. The methods may also or instead be caused to be performed, at least partially, by rig personnel utilizing one or more instances of the apparatus shown in one or more of FIGS. 1-4, and/or otherwise within the scope of the present disclosure. Thus, the following description of example methods refer to apparatus shown in one or more of FIGS. 1-4. However, the methods may also be performed in conjunction with implementations of apparatus other than those depicted in FIGS. 1-4 that are also within the scope of the present disclosure.

During well construction operations, electrical power demand changes frequently and significantly (i.e., to a high degree) during different stages of the well construction operations. For example, electrical power demand may be relatively high during actual drilling, when the top drive 116 rotates the drill string 120 and the mud pumps 144 are circulating drilling fluid into the wellbore 102 via the drill string 120. Such electrical power demand may increase as the total and/or true vertical depth of the wellbore 102 increases. Electrical power demand may be relatively low during make-up operations, when the iron roughneck 165 is operating and the top drive 116 is not rotating the drill string 120 and the mud pumps 144 are not circulating the drilling fluid. The electrical power demand may suddenly increase to relatively high levels during tripping operations, when the drawworks 118 lifts the drill string 120 upward. Electrical power demand may be relatively low during break out operations, when the iron roughneck 165 is operating to disconnect each subsequent tubular joint and the drawworks 118 is not lifting the drill string 120 upward. Electrical power demand may progressively decrease during tripping operations as the total length of the drill string 120 decreases after each tubular joint is disconnected from the drill string 120. Electrical power demand changes significantly during transitions between actual drilling operations and make-up operations, and during transitions between tripping operations and break out operations. For example, during a spudding stage of the well construction operations, electrical power demand may range between about 0.18-0.6 megawatts. During connection (e.g., make-up or break out) operations, electrical power demand may range between about 0.3-0.7 megawatts. During tripping operations, electrical power demand may range between about 0.3-1.5 megawatts or higher depending, for example, on trip speed and bit depth at time tripping cycle begins. During actual drilling operations, electrical power demand may range between about 2.0-3.0 megawatts or higher depending, for example, on well formation.

Efficiency of a generator unit 320 increases as load on its engine increases (e.g., total work per gallon of fuel consumed (kWh/gal)). For example, fuel efficiency of a generator unit 320 (e.g., diesel fuel generating units) may be optimal at engine loads ranging between, for example, about 50% and about 100%. However, during well construction operations, the generator units 320 collectively output electrical power to match electrical power demand of the well construction equipment 316, regardless of fuel efficiency. Thus, during stages of well construction operations demanding relatively low levels of electrical power, the generator units 320 collectively operate at low efficiency. Efficiency of the generator units 320 is also relatively low during generator warm-up periods, which may take several minutes. However, during stages of well construction operations utilizing relatively high levels of electrical power, one or more additional generator units 320 may be turned on to provide additional electrical power without permitting the additional generator units 320 to properly warm up. While operating at low efficiency or before a proper warm-up, the generator units 320 also discharge pollutants (or exhaust emissions) and unburnt fuel at higher rates. For example, when a diesel engine is not completely burning diesel fuel ("wet stacking") at lower loads, the unburned fuel can cause higher oily sludge discharge that can foul turbos of the engines, gum up exhaust systems of the engines, and generate pollutants.

The power manager 310 may be operable to automate selected operations of the power equipment 320-325 and, thus, cause the selected operations to be performed without manual control of the power equipment 320-325 by a human user (e.g., the driller or other rig personnel). The power manager 310 may be operable to receive and store machine-readable and executable program code instructions on a data storage device. After operation of the power manager is initiated, the power manager 310 may be operable to execute the program code instructions to run, operate, or perform one or more power management operations for controlling the power equipment 320-325 to cause the power equipment 320-325 to operate in a predetermined manner.

The operating power manager 310 may be further operable to receive the power equipment sensor data output by the power equipment sensors 340-345 and receive the power management settings from the HMI 311. Each power management setting may be associated with a corresponding mode of operation of the power manager. Each power management setting may be manually entered to the power manager 310 by a human user via the HMI 311 (or other HMI). The power manager 310 may then, for each power management setting, change the mode of operation of the power manager to the mode of operation associated with that power management setting. The power manager 310 may then output power control data to the power equipment 320-325 based on the operational data and the mode of operation that the power manager 310 is in to control the manner in which the electrical power is being supplied by the power equipment 320-325 to the well construction equipment 316 via the bus 318 during the well construction operations. Thus, for each mode of operation, the power manager 310 may cause the power equipment 320-325 to supply electrical power to the well construction equipment 316 in a predetermined manner with respect to that mode of operation. In an example implementation, the power manager 310 may cause the power equipment 320-325 to supply electrical power to the well construction equipment 316 in an optimal or otherwise predetermined manner with respect to a corresponding mode of operation. For example, for each mode of operation, the power manager 310 may be operable to make decisions related to the selection of actions to be performed by the power equipment 320-325 to cause the power equipment 320-325 to operate in an optimal or otherwise predetermined manner, such as with respect to rate of pollutant emissions by the power equipment, fuel efficiency of the power equipment, operational life of the power equipment, and cost of operating the power equipment.

Accordingly, one or more aspects of the present disclosure are directed to systems and methods for monitoring and controlling collective operations of the power equipment 320-325 of the PS system 314 at the wellsite 302 to optimize individual and/or collective operation of such power equipment 320-325 with respect to a corresponding mode of operation. The following paragraphs describe several example modes of operation of the power manager 310 and the corresponding manner in which the power manager 310 causes the power equipment to supply electrical power to the well construction equipment 316.

The modes of operation of the power manager 310 may be or comprise, for example, a minimum pollution mode of operation, a minimum fuel consumption mode of operation, a maximum operational life mode of operation, and a hybrid mode of operation comprising a combination of the other modes of operation. Depending on the mode of operation, the power manager 310 may be operable to adjust the manner of operation of one or more of the power equipment 320-325 to operate the power equipment 320-325 in an optimal or otherwise predetermined manner with respect to that mode of operation. The power manager 310 may be operable to cause the power equipment 320-325, such as the generator units 320, to achieve optimal or otherwise predetermined operation based on additional sensor data from various sensors (i.e., feedback sources). The sensor data may comprise qualitative and quantitative emissions data and engine status data from local engine controllers 330, including engine speed data, fuel consumption data, fuel rack position data, turbo boost pressure data, cylinder temperature data, and air intake/exhaust temperature data. The sensor data may further comprise electric generator data from local microprocessor, central controller 312, or analog or digital based generator controllers 330 or plurality of controllers, including sensor data indicative of total work (e.g., kWh/MWh, phase current, phase-to-phase voltage, real power (kW), reactive power (kVAR), etc.). Such electric generator data may be output or otherwise facilitated by power monitoring equipment or devices, including power quality analyzers, kVAR/kW transducers, central controller 312, and power analyzer I/O modules related to microprocessor based controllers (e.g., PLCs, PCs, DCSs, etc.) or plurality of aforementioned devices.

When the power manager 310 is in the minimum pollution mode of operation, the power manager 310 may cause the power equipment 320-325 to supply electrical power to the well construction equipment 316 in a manner that minimizes emission rate of pollutants by the power equipment 320-325. For example, the power manager 310 may determine which of the available power equipment 320-325 is to be operated to supply electrical power and at what optimal or otherwise predetermined operational parameters in order to minimize emission rate of pollutants, such as PM, CO, $CO_2$, NO, and $NO_2$. The power manager 310 may utilize emission sensor data, calculate pollutant emission rates based on data provided by engine manufacturer, or utilize a combination of emission sensor data and calculated pollutant emission rates to record and evaluate the pollutant emission rates to determine the amount of each pollutant type based upon the amount of work output (e.g., measured in kilowatt-hours (kWh)), number of generator units 320 online (or operating), generator unit load, source of electrical power (e.g., energy storage unit), and total fuel consumed. As the total work done increases and fuel consumption decreases per unit of work (i.e., the ratio of work per gallon of fuel consumed increases), the pollutant emission rates per unit of work will decrease. The total amount of work done (e.g., measured in kWh) along with various other data values (e.g., fuel consumption, engine load, engine speed, generator power output, etc.) may then be further evaluated utilizing various statistical analytics or mathematical formulas to determine if operation of the power equipment 320-325 has been efficiently optimized with respect to the minimum pollution mode of operation. For example, if three 1.0 Megawatt (MW) generator units are each operating at 25% load for one hour, the net work done is 750 kWh. If one 1.0 MW generator unit operating at 75% load for one hour, the net work done is also 750 kWh. However, based on the emissions data reported by the engine manufacturers, the three generator units operating at 25% load will emit more $CO_2$ than one generator unit operating at 75% load. Furthermore, if the rig is connected to a hi-line, solar, or other renewable energy source, the power manager 310 may turn off all generator units 320 and operate the alternative energy/power sources 321-325.

The modes of operation of the power manager 310 may be or comprise, for example, a plurality of minimum pollution modes of operation, wherein each minimum pollution mode of operation may be associated with a corresponding pollutant emitted by the power equipment. When the power manager 310 is in one of the minimum pollution mode of operation, the power manager 310 may cause the power equipment 320-325 to supply electrical power to the well construction equipment 316 in a manner that minimizes emission rate by the power equipment 320-325 of the pollutant associated with that minimum pollutant mode of operation. For example, each minimum pollution mode of operation may be associated with one or more (or a combination) of the pollutants PM, CO, $CO_2$, NO, and $NO_2$, and cause the power manager 310 to cause the power equipment 320-325 to supply electrical power to the well construction equipment 316 in a manner that minimizes emission rate by the generator unit 320 of a set (or selected) one or more of the pollutants PM, CO, $CO_2$, NO, and $NO_2$ or by means of turning off all engines and utilizing energy/power available from the power sources 321-325.

Figure 5:
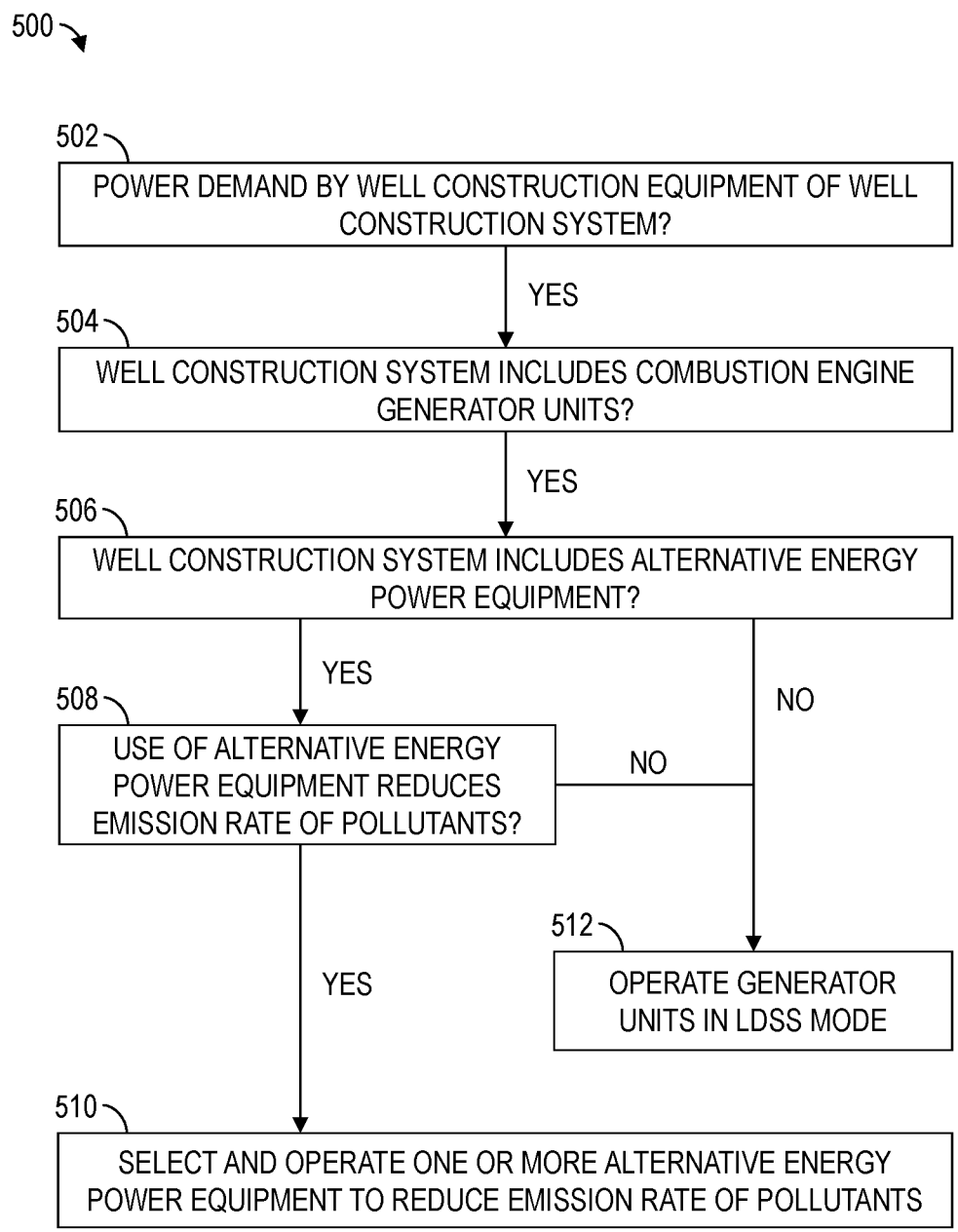
FIG. 5 is a flow-chart diagram of at least a portion of a method according to one or more aspects of the present disclosure.

FIG. 5 is a flow-chart diagram of at least a portion of an example method (or operation) 500 implemented by the power manager 310 of the well construction system 300 shown in FIG. 3 when the power manager 310 is in the minimum pollution mode of operation. Accordingly, the following description refers to FIGS. 3 and 5, collectively.

During the minimum pollution mode of operation, the power manager 310 may determine (or sense) 502 if the well construction equipment 316 of the well construction system 300 demands power via the bus 318 for performing the well construction operations. If the well construction equipment 316 demands power, the power manager 310 may then determine 504 if the PS system 314 includes one or more generator units 320. If the PS system 314 does include one or more generator units 320, the power manager 310 may then determine 506 if the PS system 314 includes one or more alternative energy electrical power equipment 321-325. If the PS system 314 does include one or more alternative energy electrical power equipment 321-325, the power manager 310 may then determine 508 if the use of one or more of such alternative energy electrical power equipment 321-325 reduces the emission rate of pollutants by the engines of the generator units 320. If the use of one or more of such alternative energy electrical power equipment 321-325 does reduce the emission rate of pollutants by the engines of the generator units 320, the power manager 310 may then select and operate 510 (i.e., turn on or otherwise use) one or more of the alternative energy electrical power equipment 321-325 to reduce the emission rate of pollutants. However, if the PS system 314 does not include one or more alternative energy electrical power equipment 321-325 or if the use of one or more of alternative energy electrical power equipment 321-325 does not reduce the emission rate of pollutants by the engines of the generator units 320, the power manager 310 may then operate 512 the generator units 320 in a load-dependent start/stop (LDSS) mode of operation.

When the power manager 310 is in the minimum fuel consumption mode of operation, the power manager 310 may cause the power equipment 320-325 to supply electrical power to the well construction equipment 316 in a manner that minimizes the consumption of fuel by the power equipment 320-325. For example, when the generator units 320 powered with a combustible fuel (e.g., diesel, natural gas, diesel/gas blend, etc.) are used to generate electrical power for the well construction equipment 316, the power manager 310 may determine which of the available generator units 320 and other power equipment 321-325 are to be used and at what optimal or otherwise predetermined operational parameters to minimize the amount of fuel that is consumed by each of the generator units 320. The method for minimizing fuel use (or optimizing fuel efficiency of the generator units 320) may be similar to the methods used for minimizing the rate of pollutant emissions. For example, fuel efficiency of the engines of the generator units 320 can be determined by calculating total work done (e.g., measured in kWh or MWh) by the generator units 320 and comparing the total work done to the total fuel consumed. The rate of fuel consumed per amount of work performed may therefore be optimized by increasing the total work done while minimizing the amount of fuel consumed.

Figure 6:
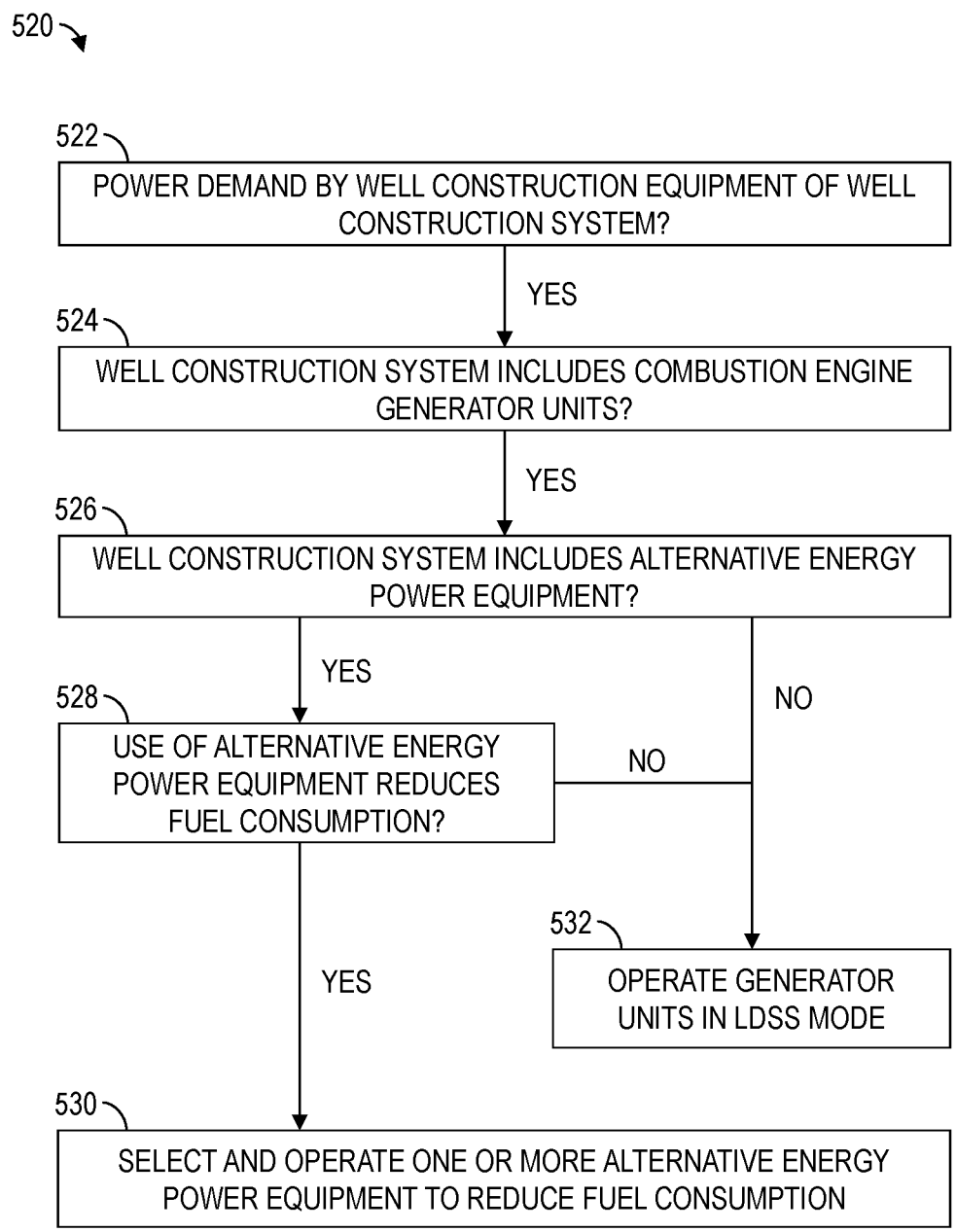
FIG. 6 is a flow-chart diagram of at least a portion of a method according to one or more aspects of the present disclosure.

FIG. 6 is a flow-chart diagram of at least a portion of an example method (or operation) 520 implemented by the power manager 310 of the well construction system 300 shown in FIG. 3 when the power manager 310 is in the minimum fuel consumption mode of operation. Accordingly, the following description refers to FIGS. 3 and 6, collectively.

During the minimum fuel consumption mode of operation, the power manager 310 may determine (or sense) 522 if the well construction equipment 316 of the well construction system 300 demands power via the bus 318 for performing the well construction operations. If the well construction equipment 316 demands power, the power manager 310 may then determine 524 if the PS system 314 includes one or more generator units 320. If the PS system 314 does include one or more generator units 320, the power manager 310 may then determine 526 if the PS system 314 includes one or more alternative energy electrical power equipment 321-325. If the PS system 314 does include one or more alternative energy electrical power equipment 321-325, the power manager 310 may then determine 528 if the use of one or more of such alternative energy electrical power equipment 321-325 reduces the rate of fuel consumption by the engines of the generator units 320. If the use of one or more of such alternative energy electrical power equipment 321-325 does reduce the rate of fuel consumption by the engines of the generator units 320, the power manager 310 may then select and operate 530 (i.e., turn on or otherwise use) one or more of the alternative energy electrical power equipment 321-325 to reduce the rate of fuel consumption. However, if the PS system 314 does not include one or more alternative energy electrical power equipment 321-325 or if the use of one or more of alternative energy electrical power equipment 321-325 does not reduce the rate of fuel consumption by the engines of the generator units 320, the power manager 310 may then operate 532 the generator units 320 in the LDSS mode of operation.

When the power manager 310 is in the maximum operational life mode of operation, the power manager 310 may cause the power equipment 320-325 to supply electrical power to the well construction equipment 316 in a manner that maximizes operational life of the power equipment 320-325. For example, when the generator units 320 powered with a combustible fuel are used to generate electrical power for the well construction equipment 316, the power manager 310 may determine which of the available generator units 320 are to be used and at what optimal operational parameters, such as to minimize the amount of runtime (or operating time) each of the generator units 320 is to be operated and therefore minimize the amount of wear experienced by each of the generator units 320. The power manager 310 may control when the engine of each generator unit 320 starts or stops, such as based on electrical power demand by the well construction equipment 316. The power manager 310 may control when the engine of each generator unit 320 starts further based on number of generator units 320 that are online and load per generator unit engine. For example, if multiple engines are online and running at low loads, the power manager 310 may turn off one or more generator units 320. A human user may input into the power manager 310 via the HMI 311 operational specifications of the generator units 320 and/or a maintenance schedule (i.e., a plan or timeline) of the generator units 320 to permit the power manager 310 to allocate to the generator units 320 intended operational goals (or plans) listed in the maintenance schedule. The power manager 310 may therefore be operable to align operations of each generator unit 320 with the operational goals listed in the maintenance schedule. The operational goals may include, for example, maintenance programs, timelines for moving generator units 320 to another wellsite, reliability of a generator unit 320 with respect to another generator unit 320 at the same wellsite 308, and/or simply to even the runtime (e.g., measured in hours) to extend the general life of (e.g., the engines) of the generator units 320. The operational goals may include, for example, tasks, operations, and/or timetables listed in the well construction plan 252. By monitoring the engine runtime hours and engine loads, and providing the ability to control which generator unit 320 is started and how long it is run, the human user can ensure that each generator unit 320 is operated in a manner that optimizes (or maximizes) its operational life.

Figure 7:
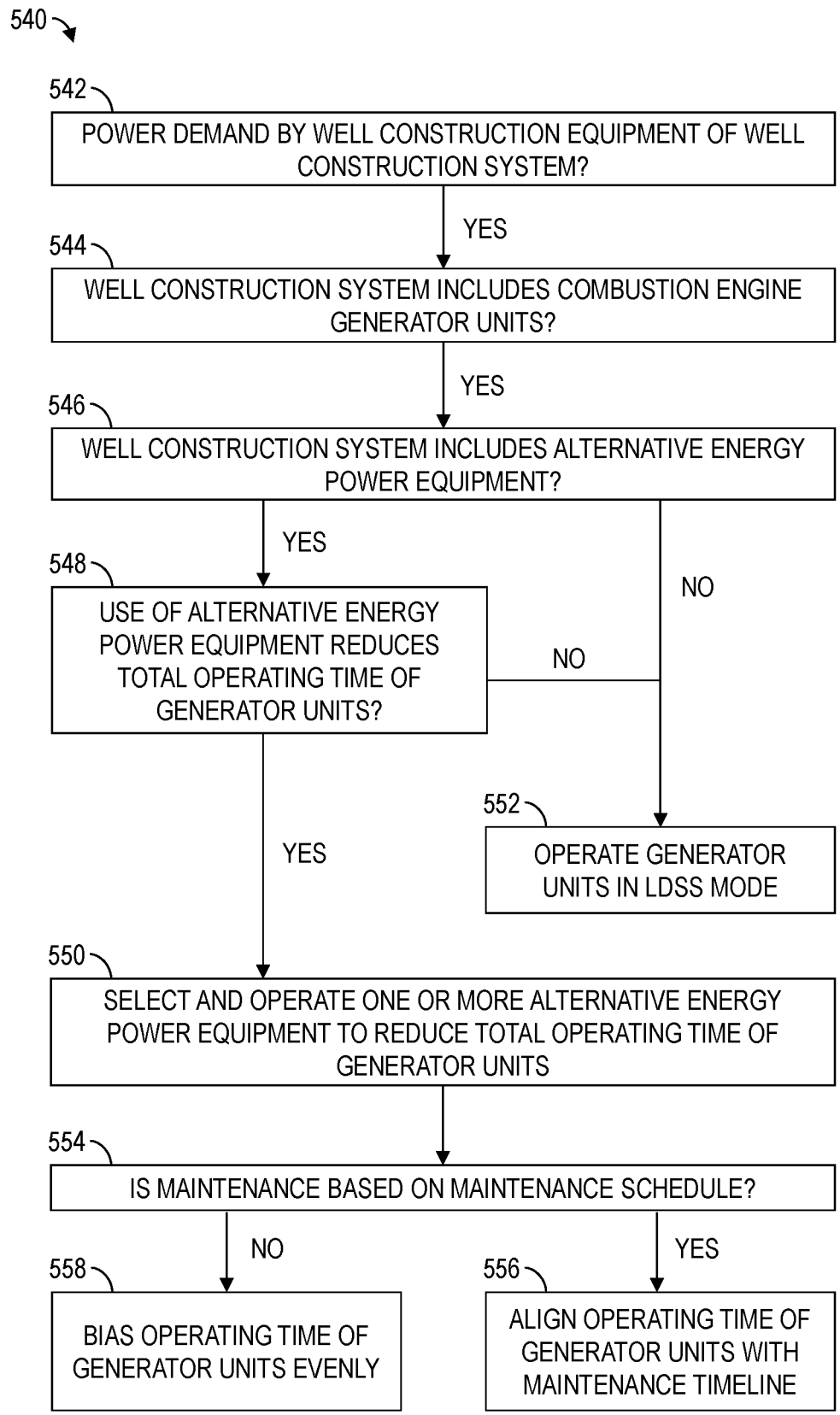
FIG. 7 is a flow-chart diagram of at least a portion of a method according to one or more aspects of the present disclosure.

FIG. 7 is a flow-chart diagram of at least a portion of an example method (or operation) 540 implemented by the power manager 310 of the well construction system 300 shown in FIG. 3 when the power manager 310 is in the maximum operational life mode of operation. Accordingly, the following description refers to FIGS. 3 and 7, collectively.

During the maximum operational life mode of operation, the power manager 310 may determine (or sense) 542 if the well construction equipment 316 of the well construction system 300 demands power via the bus 318 for performing the well construction operations. If the well construction equipment 316 demands power, the power manager 310 may then determine 544 if the PS system 314 includes one or more generator units 320. If the PS system 314 does include one or more generator units 320, the power manager 310 may then determine 546 if the PS system 314 includes one or more alternative energy electrical power equipment 321-325. If the PS system 314 does include one or more alternative energy electrical power equipment 321-325, the power manager 310 may then determine 548 if the use of one or more of such alternative energy electrical power equipment 321-325 reduces the total runtime (or operating time) of the engines of the generator units 320. If the use of one or more of such alternative energy electrical power equipment 321-325 does reduce the total runtime of the engines of the generator units 320, the power manager 310 may then select and operate 550 (i.e., turn on or otherwise use) one or more of the alternative energy electrical power equipment 321-325 to reduce the total runtime of the engines of the generator units 320. However, if the PS system 314 does not include one or more alternative energy electrical power equipment 321-325 or if the use of one or more of alternative energy electrical power equipment 321-325 does not reduce the total runtime of the engines of the generator units 320, the power manager 310 may then operate 552 the generator units 320 in the LDSS mode of operation. The power manager 310 may also determine 554 if maintenance performed on the generator units 320 is based on a maintenance schedule. If the maintenance performed on the generator units 320 is based on a maintenance schedule, the power manager 310 may then operate 556 the generator units 320 such that the operations (e.g., runtime) of the generator units 320 are aligned with the operational (e.g., maintenance) goals listed in the maintenance schedule. However, if the maintenance performed on the generator units 320 is not based on a maintenance schedule, the power manager 310 may then bias 558 operation of the generator units 320 such that the total runtime (or operating time) of the generator units 320 is evenly distributed between the generator units 320.

When the power manager 310 is in the hybrid mode of operation, the power manager 310 may cause the power equipment 320-325 to supply electrical power to the well construction equipment 316 in a manner that achieves one or more operational goals. The operational goals may include minimizing the emission rate of pollutants by the power equipment 320-325, minimizing the consumption of fuel by the power equipment 320-325, and maximizing operational life of the power equipment 320-325, as exemplified in the flow charts 500, 520, 540 shown in FIGS. 5-7. While in the hybrid mode of operation, the power manager 310 may determine which of the power equipment 320-325 to operate (or turn on) and determine the operational parameters for operating the power equipment 320-325 resulting in an optimal balance (or combination) of the individual operational goals of the hybrid mode of operation. For example, while in the hybrid mode of operation, the power manager 310 may be operable to permit the human user to rank (e.g., select as first, second, and third) the individual operational goals of the hybrid mode of operation in order of preference or importance. While in the hybrid mode of operation, the power manager 310 may also or instead permit the human user to adjust (increase and decrease) relative weight (e.g., in terms of percentage) that is given to each individual operational goal. The power manager 310 may then determine the operational parameters of the power equipment 320-325 resulting in optimal performance of the power equipment 320-325 while being constrained by the intended operational goals of the hybrid mode of operation.

The present disclosure is further directed to an HMI usable by a human user during well construction operations to monitor and control the power manager 310 to thereby monitor and control the power equipment 320-325 of the well construction system 300. For example, the HMI may be usable by the human user to enter a plurality of power management settings into the power manager 310. Each power management setting may be associated with a corresponding mode of operation of the power manager 310. The power manager 310 may then, for each power management setting, change its mode of operation to the mode of operation associated with that power management setting. The HMI may be operable to display (or output) a display screen showing to the human user predetermined performance metrics associated with each of the modes of operation of the power manager 310. The HMI may also be used to provide real time feedback on how the mode of control is performing relative to an alternative mode of control. For example, the user may choose to operate in emissions reduction mode, but due to the performance of the equipment, the emissions may not be able to be reduced. If emissions reduction is not possible due to equipment performance, the HMI may display that the operator should switch to fuel economizing mode in order to reduce fuel consumption and equipment performance.

Figure 8:
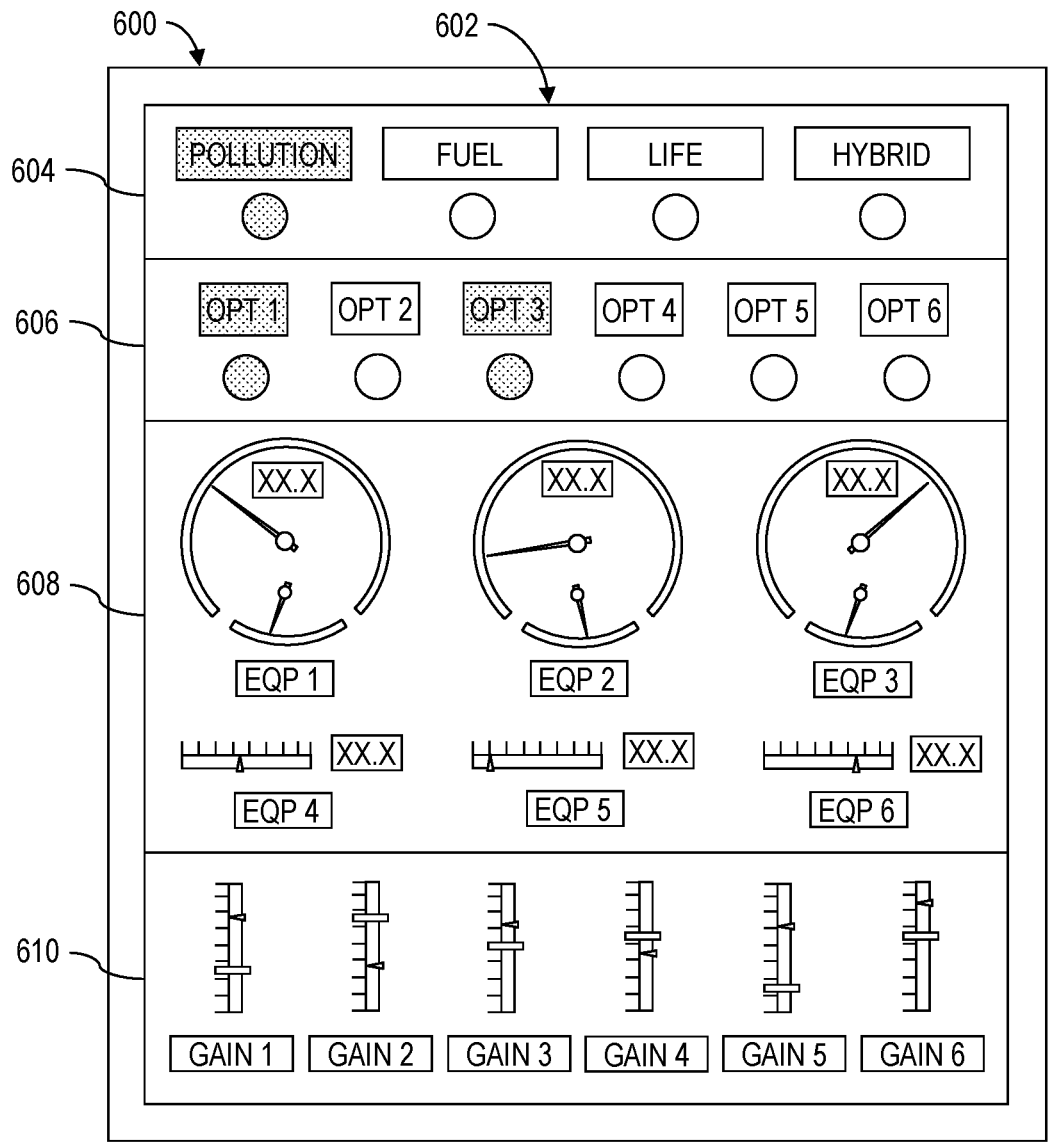
FIG. 8 is a schematic view of at least a portion of an example implementation of apparatus according to one or more aspects of the present disclosure.

FIG. 8 is an example implementation of a display screen 602 that may be displayed by an HMI 600 according to one or more aspects of the present disclosure. The HMI 600 may be or comprise an example implementation of the HMIs 264, 311 shown in FIGS. 2 and 3, respectively. The following description refers to FIGS. 1-8, collectively.

The display screen 602 may comprise a power management setting and mode of operation confirmation area (or window) 604, which may be utilized by the human user to set (or select) the mode of operation of the power manager 310 and to visually confirm in which mode of operation the power manager 310 is operating. For example, the power manager 310 may be operated in the minimum pollution mode of operation, in which the power manager 310 causes the power equipment 320-325 to supply electrical power to the well construction equipment 316 in a manner that minimizes emission rate of pollutants by the power equipment 320-325. The power manager 310 may instead be operated in a minimum fuel consumption mode of operation, in which the power manager 310 causes the power equipment 320-325 to supply electrical power to the well construction equipment 316 in a manner that minimizes the consumption of fuel by the power equipment 320-325. The power manager 310 may instead be operated in a maximum operational life mode of operation, in which the power manager 310 causes the power equipment 320-325 to supply electrical power to the well construction equipment 316 in a manner that maximizes operational life of the power equipment 320-325. The power manager 310 may instead be operated in a hybrid mode of operation, in which the power manager 310 causes the power equipment 320-325 to supply electrical power to the well construction equipment in a manner that minimizes the emission rate of pollutants by the power equipment, minimizes the consumption of fuel by the power equipment, and maximizes operational life of the power equipment.

The window 604 may comprise a plurality of virtual (or software) buttons containing a description (e.g., text, icons, graphics, etc.) of the modes of operation of the power manager 310. One of the buttons may be operated (e.g., touched, clicked on, etc.) by the human user to cause the HMI 311 to output (or transmit) power management settings (or signals) to the power manager 310 to set (or select) the mode of operation in which the power manager 310 is to operate. The button associated with the set or otherwise current mode of operation of the power manager 310 may appear or become lit, highlighted, or otherwise marked to indicate to the human user the current mode of operation of the power manager 310. The window 604 may further include a plurality of virtual (or software) indicators (e.g., lights), each associated with a corresponding button listing the modes of operation of the power manager 310. One of the indicators may activate (e.g., light up, change color, etc.) to visually confirm or otherwise indicate to the human user the current mode of operation of the power manager 310.

The display screen 602 may comprise a power management mode of operation options area (or window) 606, which may be utilized by the human user to set (or select) various available options associated with each mode of operation of the power manager 310 and to visually confirm which options of each mode of operation have been set by the human user. For example, while the power manager 310 is operated in the minimum pollution mode of operation, the human user may set the power manager 310 to minimize the emission of one or more of the pollutants PM, CO, $CO_2$, NO, and $NO_2$, such that the power manager 310 causes the power equipment 320-325 to supply electrical power to the well construction equipment 316 in a manner that minimizes the emission rate of the set (or selected) one or more of the pollutants PM, CO, $CO_2$, NO, and $NO_2$ by the generator unit 320 of the power equipment 320-325. Furthermore, while the power manager 310 is operated in the hybrid mode of operation, the human user may rank the individual operational goals of the hybrid mode of operation in order of preference or set (increase and decrease) relative weight that is given to each individual operational goal.

The window 606 may comprise a plurality of virtual (or software) buttons containing a description (e.g., text, icons, graphics, etc.) of the available options associated with the selected mode of operation of the power manager 310. One or more of the buttons may be operated by the human user to set (or select) one or more options associated with each mode of operation of the power manager 310. The button associated with the set option may appear or become lit, highlighted, or otherwise marked to indicate to the human user which options of each mode of operation have been selected. The window 606 may further include a plurality of virtual (or software) indicators (e.g., lights), each associated with a corresponding button listing an option of a corresponding mode of operation. One or more of the indicators may activate to visually confirm or otherwise indicate to the human user which options of the set mode of operation of the power manager 310 have been selected.

The display screen 602 may further comprise an operational status area (or window) 608, displaying selected sensor signals or information indicative of operational status (e.g., performance metrics or measurements) of selected power equipment 320-325. The operational status window 608 may display information, such as rate of pollutants emitted by the power equipment 320-325 (e.g., the engines of the generator units 320) and rate of fuel consumed by the power equipment 320-325. The operational status window 608 may also or instead display projected (or calculated) remaining operational life of the power equipment 320-325, such as current total (or cumulative) runtime (or operating time) or remaining runtime until maintenance should be performed. The operational status window 608 may also or instead display current or total (or cumulative) cost of operating one or more of the power equipment 320-325, such as based on fuel cost (e.g., gasoline cost), utility cost (e.g., electricity cost), and maintenance cost (e.g., labor cost, replacement parts cost, etc.). The information displayed in the operational status window 608 may change during the well construction operations as different power equipment 320-325 is operated or taken offline. The information in the operational status window 608 may be displayed in the form of numerical values, tables, graphs, bars, gauges, lights, and/or schematics, among other examples.

The display screen 602 may further comprise optimization gains area (or window) 610 displaying information indicative of optimization gains (or optimized operational statuses) for one or more of the power equipment 320-325. The optimization gains may be determined (or calculated) with respect to normal operational status of the power equipment 320-325, such as when the power manager 310 in not used to optimize operation of the power equipment 320-325. The optimization gains may be determined for operational statuses managed by or otherwise associated with the set mode of operation of the power manager 310. For example, the optimization gains information shown in the optimization gains area 610 may include a decrease of the emission rate of pollutants by the power equipment 320-325, a decrease in the rate of fuel consumption (or increase in fuel efficiency) by the power equipment 320-325, and an increase in operational life (or decrease of wear or break-downs) of the power equipment 320-325. The optimization gains area 610 may display information (e.g., text) identifying the type of optimization gains shown and information (e.g., bars, graphs, numerical values, etc.) indicative of the magnitude of the optimization gains.

As described above, the modes of operation of the power manager 310 may be or comprise, for example, a minimum pollution mode of operation, a minimum fuel consumption mode of operation, a maximum operational life mode of operation, and a hybrid mode of operation comprising a combination of the other modes of operation. Depending on the mode of operation, the power manager 310 may be operable to adjust the manner of operation of one or more of the power equipment 320-325 to operate the power equipment 320-325 in an optimal or otherwise predetermined manner with respect to that mode of operation. The following description is directed to example logic (or reasoning) based on which the power manager 310 selects which of the power equipment 320-325 is to be operated to supply electrical power to the well construction equipment 316 and the manner (e.g., operational parameters) in which the selected power equipment 320-325 is to be operated. The following description refers to FIGS. 1-8, collectively.

When the power manager 310 is in the minimum fuel consumption mode of operation, the power manager 310 may be operable to monitor and control operations (e.g., start/stop and engine load percentage) of the generator units 320 based on measured load demand by the well construction equipment 316 and electrical power that is available from the power equipment 320-325. For example, during times (e.g., stages or periods) of lower peak electrical power demand (e.g., below about 1.0 megawatt) during which the well construction operations utilize relatively low levels of electrical power, the power manager 310 may turn off one or more of the generator units 320, thereby causing the remaining generator units 320 to meet the electrical power demand and, thus, operate at higher efficiencies.

For example, during times of lower average electrical power demand by the well construction equipment 316, the power manager 310 may also or instead maintain each generator unit 320 as operational or turn off fewer generator units 320 while simultaneously establishing an electrical connection between one or more of the operating generator units 320 and the storage unit 322 to charge the storage unit 322 while the generator units 320 continue to provide electrical power to the well construction equipment 316. The charging of the storage unit 322 increases the load on each operating generator unit 320, thereby causing each operating generator unit 320 to operate at a high efficiency. Operating each generator unit 320 at higher efficiency reduces the amount of fuel consumed by each generator unit 320 per unit of electrical power produced. When the storage unit 322 becomes charged to a predetermined level (e.g., between about 80% and about 100%) before the time of lower average electrical power demand by the well construction equipment 316 is over, then the power manager 310 may turn off one or more of the generator units 320, such as may permit the operating generator units 320 to continue to operate at high efficiency. However, when the storage unit 322 becomes charged to a predetermined level while the average electrical power demand by the well construction equipment 316 is relatively low (e.g., below about 400 kilowatts), then the power manager 310 may turn off each of the generator units 320 and cause the storage unit 322, the regen unit 323, and the solar power unit 324 to supply electrical power to the well construction equipment 316. For example, during drill string tripping operations, the average electrical power demand may be about 460 kilowatts and the peak intermittent electrical power demand may be about 1.5 megawatts. During such drill string tripping operations, the power manager 310 may operate the storage unit 322 and just one generator unit 320 and/or one or more of the regen unit 323 and the solar power unit 324 collectively capable of generating about 1.0 megawatt to collectively supply electrical power to the well construction equipment 316 (e.g., the drawworks 118) to facilitate the drill string tripping operations. That is, the power manager 310 may cause the generator unit 320 and the storage unit 322 to collectively supply electrical power to the well construction equipment 316 when the drill string 120 is being lifted. However, during break out operations, the power manager 310 may cause some of the electrical power from the generator unit 320 to supply electrical power to other well construction equipment 316 (e.g., the iron roughneck 165 and other auxiliary devices) and some of the electrical power to be stored by the storage unit 322, thereby retaining a high load on the generator unit 320 while continually charging and discharging the storage unit 322. The power manager 310 may turn on one or more of the generator units 320, the regen units 323, and solar power units 324 when the storage unit 322 becomes discharged or when the average electrical power demand by the well construction equipment 316 increases.

Regardless of whether the power manager 310 is in the minimum pollution mode of operation, the minimum fuel consumption mode of operation, the maximum operational life mode of operation, or the hybrid mode of operation, the power manager 310 may be operable to monitor and control operations of the power equipment 320-325 based on the well construction plan 252 uploaded or saved to the data storage device 353 or otherwise made accessible to the power manager 310. As described above, the well construction plan 252 may comprise a planned drilling profile and other information indicative of upcoming (i.e., near future) operations (e.g., events) to be performed by the well construction equipment 316. The well construction plan 252 may also comprise a planned electrical power demand profile indicative of electrical power demand levels for performing or otherwise associated with each planned stage, portion, sequence, task, and/or operation of the well construction operations. The drilling plan 252 may also comprise information indicative of electrical power output (or supply) capabilities of each of the power equipment 320-325. The power manager 310 may instead be operable to monitor and control operations of the power equipment 320-325 based on an operational sequence selected from the sequence database 260 by the sequence selector 258 based on a detected abnormal event or operational state of the well construction system 300.

The power manager 310 may receive and analyze the well construction plan 252 to ensure that the storage unit 322 is optimally charged to facilitate optimal distribution and utilization of electrical energy output by the energy storage unit 322, the generator units 320, the electrical power grid 321, the regen unit 323, and the solar power unit 324. For example, when the power manager 310 is in the minimum fuel consumption mode of operation or the hybrid mode of operation, the power manager 310 may be operable to turn on or turn off one or more of the generator units 320 and/or charge the storage unit 322 based on information indicative of upcoming operations contained in the drilling plan 252. During times of lower average electrical power demand, the power manager 310 may cause one or more of the generator units 320 to output electrical power and cause the storage unit 322 to receive and store the electrical power. The charging of the storage unit 322 increases the load on the operating generator units 320, thereby causing the operating generator units 320 to operate at higher efficiency. Such operations of the generator units 320 and the storage unit 322 may be caused by the power manager 310 based on the drilling plan 252. For example, when the power manager 310 determines that a time period (or stage) of lower power demand (e.g., average or intermittent) is coming up in the near future, then the power manager 310 may turn off a generator unit 320 or increase load on the generator unit 320 via the storage unit 322 at a substantially (or mostly) exact time at which the time of lower power demand starts, because such time is indicated in the drilling plan 252. When the power manager 310 determines that a time period of lower power demand is coming up in the near future, then the power manager 310 may turn off most or each generator unit 320 and turn on or maintain operation of the power grid 321, the storage unit 322, the regen unit 323, and/or the solar power unit 324, or other power source 325 (e.g., a wind turbine) at a substantially exact time at which the time of lower power demand starts based on the drilling plan 252. Conversely, when the power manager 310 determines that a time period of higher power demand (e.g., average or intermittent) is coming up in the near future, then the power manager 310 may turn on a generator unit 320 a predetermined amount of time (e.g., a few minutes) before the period of higher power demand starts, thus permitting that generator unit 320 to properly warm-up. The starting time of the period of higher power demand is known because such time is indicated in the drilling plan 252.

Furthermore, when the power manager 310 determines that a period of higher power demand (e.g., average or intermittent) is coming up in the near future, then the power manager 310 may cause the storage unit 322 to stop charging and output electrical power to the bus 318 at a substantially exact time the period of higher power demand starts. Also, when the power manager 310 determines that a time period of intermittent higher power demand, but relatively low average power demand (e.g., the drill string tripping operations), is coming up in the near future, the power manager 310 may cause the storage unit 322 to store electrical energy to meet such electrical power demand. For example, the power manager 310 may cause the storage unit 322 to increase the electrical load of the currently operating generator units 320 or the power manager may turn on an additional generator unit 320, the regen unit 323, and/or the solar power unit 324, whereby electrical power generated in excess of current electrical power demand can stored by the storage unit 322 for use during the time period of intermittent high power demand. When the high power demand period is over, the power manager 310 may operate or utilize the energy storage unit 322 as a load to help maintain a more steady-state power load demand on the generator units 320. The power manager 310 may be further operable to optimize electrical power limit process (i.e., anti-blackout process) and/or provide advance warning for or otherwise determine when electrical load demand will exceed electrical power that is available from the power equipment 320-325, based on the drilling plan 252.

When the power manager 310 is in the minimum pollution mode of operation, the minimum fuel consumption mode of operation, the maximum operational life mode of operation, or the hybrid mode of operation, the power manager 310 may also or instead cause the storage unit 322 output more electrical power to the bus 318 when the generator units 320 that are about to experience and/or are experiencing a high transient load (i.e., heavy block load or unload) based on the drilling plan 252. A high transient load can cause the engine of the generator unit 320 to significantly increase power output to accelerate the electrical generator of the generator unit 320 to ramp up electrical power output, such as based on sensor data from the electrical power bus sensor 319. During such high transient load, fuel is injected into the engine and burned at relatively high rates, resulting in relatively high output rates of exhaust emissions and unburnt fuel. During such high transient load, the engine and various other mechanical components (e.g., gears, shafts, belts) of a generator unit 320 experience high rates of wear caused by high levels and/or sudden changes in torque, backlash, and impacts experienced during high rates of acceleration of the engine. High rates of engine acceleration can also result in overshoot of engine speed and electrical power output, mandating the engine to slow down to a steady-state speed associated with the intended electrical power output, which causes further engine wear and efficiency. Likewise, during high transient unloading of the generator unit 320, the engine power output is suddenly decreased (e.g., by reducing fuel flow) to decelerate the engine, thereby permitting the speed of the generator unit to decrease. However, when the electrical power output of the generator unit 320 reaches its intended level, the engine again accelerates at a high rate to maintain a steady-state speed and the associated electrical power output. Such repetitive heavy loading and unloading of the generator units 320 causes high rates of mechanical wear to the generator units 320.

Therefore, during a high transient load, the power manager 310 may cause the storage unit 322 to output more electrical power to the bus 318, such that the generator units 320 experience a gradual increase in load (i.e., a soft load). The power manager 310 may cause the storage unit 322 to output more electrical power to the bus 318 before or substantially at the same time as the generator units 320 that are experiencing the high transient load, based on the drilling plan 252. Outputting more electrical power into the bus 318 by the storage unit 322 reduces the rate of load increase (i.e., soft loading) to the generator units 320, causing the generator units 320 to ramp up output of electrical power slowly, thereby burning less fuel and reducing output rates of exhaust emissions and unburnt fuel. Soft loading the generator units 320 prevents or inhibits high acceleration rates and overshooting the intended speed and electrical power production of the generator units 320, thereby reducing rates of mechanical wear of the generator units 320. During this mode of operation, the power manager 310 may continuously monitor the output from the generator units 320 and the storage unit 322, and continuously adjust power output of each in an attempt to maintain a constant power output from the generator units 320 such that the generator units 320 can operate in a load leveling mode, such as when electrical power output of the generator units 320 remains constant throughout transient periods, such as during tripping.

When the power manager 310 is in the minimum pollution mode of operation or the hybrid mode of operation, the power manager 310 may be operable to monitor and control operations of the generator units 320 based further on sensor data output by the exhaust sensors 340 indicative of properties of the exhaust emissions output by the engine of each generator unit 320. For example, when the power manager 310 determines that higher quantities or proportions of particulate material and/or gases are present in the engine exhaust, the power manager 310 may turn off the generator unit 320 or increase load on the generator unit 320 via the storage unit 322.

The power manager 310 may be operable to monitor operations of the generator units 320 and control (e.g., adjust) operation of a hydrogen source 325 to optimize operations of the generator units 320 by selectively injecting hydrogen into the engines of the generator units 320. The benefits of introduction of hydrogen into the engines is weighted against the effects of hydrogen embrittlement, which is a loss of ductility and reduction of load bearing capability of metal due to the absorption of hydrogen atoms or molecules by the metal. Therefore, the power manager 310 may cause the hydrogen source 325 to inject hydrogen into the engines of the generator units 320 on a limited basis, such as when hydrogen improves efficiency and/or reduces exhaust emissions.

The power manager 310 may monitor power output by the engines of the generator units 320 and change the flow rate of hydrogen into the engines based on the measured power output and/or fuel efficiency. The power manager 310 may maintain the flow rate of hydrogen at a level resulting in the highest or otherwise optimal power output (e.g., when more engine torque is needed) and/or at a level resulting in the highest or otherwise optimal fuel efficiency (e.g., when steady-state electrical power output is attained). The power manager 310 may also or instead cause the hydrogen source 325 to inject hydrogen into the engine of one or more of the generator units 320 that are about to experience a high transient load based on information in the well construction plan 252 indicative of upcoming operations. Injecting hydrogen into the engine that is experiencing a high transient load improves burning of the fuel and/or reduces the flow rate of fuel into the engine and, thus, reduces output rates of exhaust emissions and unburnt fuel.

The power manager 310 may be operable to monitor and control operation of the hydrogen source 325 based further on sensor data output by the exhaust sensors 340. For example, the power manager 310 may monitor levels of exhaust emissions within the exhaust of the engines and change the flow rate of hydrogen into the engines based on the measured levels of exhaust emissions. When the power manager 310 determines that higher quantities or proportions of exhaust emissions are present in the engine exhaust, the power manager 310 may increase the flow rate of hydrogen into the engines to enhance combustion and, thus, reduce output of the exhaust emissions. The power manager 310 may maintain the flow rate of hydrogen at a level resulting in minimum output of the exhaust emissions.

When the power manager 310 is in the minimum pollution mode of operation, the maximum operational life mode of operation, or the hybrid mode of operation, the power manager 310 may be further operable to output control data to the electrical power grid 321 to electrically connect the electrical power grid 321 to the bus 318 to supply electrical power to the well construction equipment 316 and/or to supply electrical power to the storage unit 322 to be stored for later use. The power manager 310 may determine whether to direct the electrical power from the electrical power grid 321 to the bus 318 for use by the well construction equipment 316 and/or for storage by the storage unit 322 based on the power grid data stored on the data storage device 354. As described above, the power grid data may comprise current cost (i.e., price) of the electrical power supplied by the electrical utility company to or via the electrical power grid 321. Thus, when the cost of electrical power from the electrical power grid 321 is less than the cost of operating the generator units 320 (e.g., fuel and maintenance costs), the regen unit 323, the solar power unit 324, and/or the hydrogen source 325, then the power manager 310 may direct the electrical power from the electrical power grid 321 to the bus 318 for use by the well construction equipment 316. The power manager 310 may also cause the storage unit 322 to receive electrical power from the electrical power grid 321 via the bus 318 and store the electrical power for later use.

The power manager 310 may be further operable to direct the electrical power from the electrical power grid 321 to the bus 318 for use by the well construction equipment 316 when the generator units 320 and the storage unit 322 are not collectively operable to supply sufficient electrical power to the well construction equipment 316 to perform the well construction operations, regardless of cost of electrical power from the electrical power grid 321. Such scenario may be caused by an unforeseen or otherwise unplanned event, such as an unforeseen drilling event mandating additional flow rate of drilling fluid or fast withdraw of the drill string 120 from the wellbore 102. Such scenario may also or instead be caused by an unforeseen breakdown in one or more of the generator units 320, the storage unit 322, the regen unit 323, and/or the solar power unit 324, mandating such piece of equipment to be taken offline for maintenance.

When the power manager 310 is in the minimum pollution mode of operation or the hybrid mode of operation, the power manager 310 may also or instead determine whether to direct electrical power from the electrical power grid 321 to power the well construction equipment 316 and/or to the storage unit 322 for storage based on the current amount of exhaust emissions discharged by the engines of the generator units 320. Thus, when the generator units 320 are producing high quantities of exhaust emissions, then the power manager 310 may direct the electrical power from the electrical power grid 321 to the bus 318 for use by the well construction equipment 316 and/or for storage by the storage unit 322.

Regardless of whether the power manager 310 is in the minimum pollution mode of operation, the minimum fuel consumption mode of operation, the maximum operational life mode of operation, or the hybrid mode of operation, the power manager 310 may be further operable to change, adjust, or otherwise control operation of the well construction equipment 316 when electrical power demand of the well construction equipment 316 exceeds available power from the power equipment 320-325. Such operation, which may be referred to as an anti-blackout protection, is configured to prevent overload of the bus 318 or other electric circuitry of the well construction system. Such scenario may happen, for example, when sufficient electrical power is not available from the electrical power grid 321 and an unplanned event takes place at the wellsite. An unplanned event may include, for example, an unforeseen drilling event mandating additional flow rate of drilling fluid or fast withdraw of the drill string 120 from the wellbore 102. An unplanned event may also include an unforeseen breakdown in one or more of the generator units 320, the electrical power grid 321, the storage unit 322, the regen unit 323, and/or the solar power unit 324, mandating such piece of equipment to be taken offline for maintenance. In response to such electrical power demand, the power manager 310 may slow down or otherwise adjust operations of selected pieces of the well construction equipment 316, such as the drawworks 118, the top drive 116, the pumps 144, and various pipe handling equipment collectively operable to move tubulars during the well construction operations. The power manager 310 may also or instead turn off predetermined operations of the well construction system 300, such as well construction equipment 316 not essential to performing the well construction operations. The power manager 310 may control operations of the well construction equipment 316 directly or via the control process 250.

In view of the entirety of the present disclosure, including the figures and the claims, a person having ordinary skill in the art will readily recognize that the present disclosure introduces a system comprising: well construction equipment operable to perform well construction operations to construct a well; power equipment electrically connected to the well construction equipment, wherein the power equipment is operable to supply electrical power to the well construction equipment to permit the well construction equipment to perform the well construction operations; a plurality of power equipment sensors operable to output power equipment sensor data indicative of operational status of the power equipment; an HMI usable by a human user to enter a plurality of power management settings; and a power manager communicatively connected with the power equipment, the power equipment sensors, and the HMI. The power manager comprises a processor and a memory storing a computer program code that, when executed by the processor, causes the power manager to: receive the power equipment sensor data; receive the power management settings, wherein each power management setting is associated with a corresponding mode of operation of the power manager; for each power management setting, change the mode of operation of the power manager to the mode of operation associated with that power management setting; and for each mode of operation, cause the power equipment to supply electrical power to the well construction equipment in a predetermined manner with respect to that mode of operation.

An instance of the modes of operation may be or comprise a minimum pollution mode of operation, wherein when the power manager is in the minimum pollution mode of operation, the computer program code, when executed by the processor, may cause the power manager to cause the power equipment to supply electrical power to the well construction equipment in a manner that minimizes emission rate of pollutants by the power equipment.

An instance of the modes of operation may be or comprise a minimum fuel consumption mode of operation, wherein when the power manager is in the minimum fuel consumption mode of operation, the computer program code, when executed by the processor, may cause the power manager to cause the power equipment to supply electrical power to the well construction equipment in a manner that minimizes consumption rate of fuel by the power equipment.

An instance of the modes of operation may be or comprise a maximum operational life mode of operation, wherein when the power manager is in the maximum operational life mode of operation, the computer program code, when executed by the processor, may cause the power manager to cause the power equipment to supply electrical power to the well construction equipment in a manner that maximizes operational life of the power equipment.

When the power manager is in a first instance of the modes of operation, the computer program code, when executed by the processor, may cause the power manager to cause the power equipment to supply electrical power to the well construction equipment in a manner that minimizes emission rate of pollutants by the power equipment. When the power manager is in a second instance of the modes of operation, the computer program code, when executed by the processor, may cause the power manager to cause the power equipment to supply electrical power to the well construction equipment in a manner that minimizes consumption rate of fuel by the power equipment. When the power manager is in a third instance of the modes of operation, the computer program code, when executed by the processor, may cause the power manager to cause the power equipment to supply electrical power to the well construction equipment in a manner that maximizes operational life of the power equipment.

An instance of the modes of operation may be or comprise a hybrid mode of operation, wherein when the power manager is in the hybrid mode of operation, the computer program code, when executed by the processor, may cause the power manager to cause the power equipment to supply electrical power to the well construction equipment in a manner that: minimizes emission rate of pollutants by the power equipment; minimizes consumption rate of fuel by the power equipment; and maximizes operational life of the power equipment.

The power equipment may comprise: (A) an electric generator unit having: (i) an electric generator operable to generate electrical power; and (ii) an internal combustion engine operatively connected to and operable to actuate the electric generator; and (B) an electrical energy storage unit electrically connected to and operable to store the electrical power generated by the electric generator.

The present disclosure also introduces an apparatus comprising a power manager installable in association with a well construction rig, wherein the well construction rig comprises: well construction equipment operable to perform well construction operations to construct a well; power equipment electrically connected to the well construction equipment, wherein the power equipment is operable to supply electrical power to the well construction equipment to permit the well construction equipment to perform the well construction operations; and a plurality of power equipment sensors associated with the power equipment and operable to output power equipment sensor data indicative of operational status of the power equipment. The power manager is communicatively connectable with the power equipment and the power equipment sensors. The power manager comprises a processor and a memory storing a computer program code that, when executed by the processor, causes the power manager to: receive the power equipment sensor data; receive power management settings entered by a human user via an HMI, wherein each power management setting is associated with a corresponding mode of operation of the power manager; for each power management setting, change the mode of operation of the power manager to the mode of operation associated with that power management setting; and for each mode of operation, cause the power equipment to supply electrical power to the well construction equipment in a predetermined manner with respect to that mode of operation.

An instance of the modes of operation may be or comprise a minimum pollution mode of operation, wherein when the power manager is in the minimum pollution mode of operation, the computer program code, when executed by the processor, may cause the power manager to cause the power equipment to supply electrical power to the well construction equipment in a manner that minimizes emission rate of pollutants by the power equipment.

The modes of operation may be or comprise a plurality of minimum pollution modes of operation, each minimum pollution mode of operation may be associated with a corresponding pollutant emitted by the power equipment, and for each minimum pollutant mode of operation, the computer program code, when executed by the processor, may cause the power manager to cause the power equipment to supply electrical power to the well construction equipment in a manner that minimizes emission rate of the gas associated with that minimum pollutant mode of operation.

An instance of the modes of operation may be or comprise a minimum fuel consumption mode of operation, wherein when the power manager is in the minimum fuel consumption mode of operation, the computer program code, when executed by the processor, may cause the power manager to cause the power equipment to supply electrical power to the well construction equipment in a manner that minimizes consumption rate of fuel by the power equipment.

An instance of the modes of operation may be or comprise a maximum operational life mode of operation, wherein when the power manager is in the maximum operational life mode of operation, the computer program code, when executed by the processor, may cause the power manager to cause the power equipment to supply electrical power to the well construction equipment in a manner that maximizes operational life of the power equipment.

When the power manager is in a first instance of the modes of operation, the computer program code, when executed by the processor, may cause the power manager to cause the power equipment to supply electrical power to the well construction equipment in a manner that minimizes emission rate of pollutants by the power equipment. When the power manager is in a second instance of the modes of operation, the computer program code, when executed by the processor, may cause the power manager to cause the power equipment to supply electrical power to the well construction equipment in a manner that minimizes consumption rate of fuel by the power equipment. When the power manager is in a third instance of the modes of operation, the computer program code, when executed by the processor, may cause the power manager to cause the power equipment to supply electrical power to the well construction equipment in a manner that maximizes operational life of the power equipment.

An instance of the modes of operation may be or comprise a hybrid mode of operation, wherein when the power manager is in the hybrid mode of operation, the computer program code, when executed by the processor, may cause the power manager to cause the power equipment to supply electrical power to the well construction equipment in a manner that: minimizes emission rate of pollutants by the power equipment; minimizes consumption rate of fuel by the power equipment; and maximizes operational life of the power equipment.

The present disclosure also introduces a method comprising initiating operation of a power manager at a well construction rig, wherein the well construction rig comprises well construction equipment, power equipment electrically connected to the well construction equipment, and a plurality of power equipment sensors operable to output sensor data indicative of operational status of the power equipment, and wherein the operating power manager: receives the power equipment sensor data; receives power management settings entered via an HMI, wherein each power management setting is associated with a corresponding mode of operation of the power manager; for each power management setting, changes the mode of operation of the power manager to the mode of operation associated with that power management setting; and for each mode of operation, causes the power equipment to supply electrical power to the well construction equipment in a predetermined manner with respect to that mode of operation.

An instance of the modes of operation may be or comprise a minimum pollution mode of operation, wherein when the power manager is in the minimum pollution mode of operation, the operating power manager may cause the power equipment to supply electrical power to the well construction equipment in a manner that minimizes emission rate of pollutants by the power equipment.

An instance of the modes of operation may be or comprise a minimum fuel consumption mode of operation, wherein when the power manager is in the minimum fuel consumption mode of operation, the operating power manager may cause the power equipment to supply electrical power to the well construction equipment in a manner that minimizes consumption rate of fuel by the power equipment.

An instance of the modes of operation may be or comprise a maximum operational life mode of operation, wherein when the power manager is in the maximum operational life mode of operation, the operating power manager may cause the power equipment to supply electrical power to the well construction equipment in a manner that maximizes operational life of the power equipment.

When the power manager is in a first instance of the modes of operation, the operating power manager may cause the power equipment to supply electrical power to the well construction equipment in a manner that minimizes emission rate of pollutants by the power equipment. When the power manager is in a second instance of the modes of operation, the operating power manager may cause the power equipment to supply electrical power to the well construction equipment in a manner that minimizes consumption rate of fuel by the power equipment. When the power manager is in a third instance of the modes of operation, the operating power manager may cause the power equipment to supply electrical power to the well construction equipment in a manner that maximizes operational life of the power equipment.

An instance of the modes of operation may be or comprise a hybrid mode of operation, wherein when the power manager is in the hybrid mode of operation, the operating power manager may cause the power equipment to supply electrical power to the well construction equipment in a manner that: minimizes emission rate of pollutants by the power equipment; minimizes consumption rate of fuel by the power equipment; and maximizes operational life of the power equipment.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions, and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A system comprising:
well construction equipment operable to perform well construction operations to construct a well;
power equipment electrically connected to the well construction equipment, wherein the power equipment is operable to supply electrical power to the well construction equipment to permit the well construction equipment to perform the well construction operations;

a plurality of power equipment sensors operable to output power equipment sensor data indicative of operational status of the power equipment;

a human-machine interface (HMI) usable by a human user to enter a plurality of power management settings; and a power manager communicatively connected with the power equipment, the power equipment sensors, and the HMI, wherein the power manager comprises a processor and a memory storing a computer program code that, when executed by the processor, causes the power manager to:

receive the power equipment sensor data;

receive the power management settings, wherein each power management setting is associated with a corresponding mode of operation of the power manager;

for each power management setting, change the mode of operation of the power manager to the mode of operation associated with that power management setting; and for each mode of operation, cause the power equipment to supply electrical power to the well construction equipment in a predetermined manner with respect to that mode of operation;

wherein when the power manager is in a first instance of the modes of operation, the computer program code, when executed by the processor, causes the power manager to cause the power equipment to supply electrical power to the well construction equipment in a manner that minimizes emission rate of pollutants by the power equipment;

wherein when the power manager is in a second instance of the modes of operation, the computer program code, when executed by the processor, causes the power manager to cause the power equipment to supply electrical power to the well construction equipment in a manner that minimizes consumption rate of fuel by the power equipment; and wherein when the power manager is in a third instance of the modes of operation, the computer program code, when executed by the processor, causes the power manager to cause the power equipment to supply electrical power to the well construction equipment in a manner that maximizes operational life of the power equipment.

2. The system of claim 1, wherein
when the power manager is in a fourth instance of the modes of operation, the computer program code, when executed by the processor, causes the power manager to cause the power equipment to supply electrical power to the well construction equipment in a manner that:
minimizes the emission rate of the pollutants by the power equipment;
minimizes the consumption rate of the fuel by the power equipment; and
maximizes the operational life of the power equipment.

3. The system of claim 1 wherein the power equipment comprises:
an electric generator unit having:
an electric generator operable to generate the electrical power;
an internal combustion engine operatively connected to and operable to actuate the electric generator; and
an electrical energy storage unit electrically connected to and operable to store the electrical power generated by the electric generator.

4. An apparatus comprising:
a power manager installable in association with a well construction rig, wherein the well construction rig comprises:
well construction equipment operable to perform well construction operations to construct a well;
power equipment electrically connected to the well construction equipment, wherein the power equipment is operable to supply electrical power to the well construction equipment to permit the well construction equipment to perform the well construction operations; and
a plurality of power equipment sensors associated with the power equipment and operable to output power equipment sensor data indicative of operational status of the power equipment;
wherein the power manager is communicatively connectable with the power equipment and the power equipment sensors;
wherein the power manager comprises a processor and a memory storing a computer program code that, when executed by the processor, causes the power manager to:
receive the power equipment sensor data;
receive power management settings entered by a human user via a human-machine interface (HMI), wherein each power management setting is associated with a corresponding mode of operation of the power manager;
for each power management setting, change the mode of operation of the power manager to the mode of operation associated with that power management setting; and
for each mode of operation, cause the power equipment to supply electrical power to the well construction equipment in a predetermined manner with respect to that mode of operation;
wherein when the power manager is in a first instance of the modes of operation, the computer program code, when executed by the processor, causes the power manager to cause the power equipment to supply electrical power to the well construction equipment in a manner that minimizes emission rate of pollutants by the power equipment;
wherein when the power manager is in a second instance of the modes of operation, the computer program code, when executed by the processor, causes the power manager to cause the power equipment to supply electrical power to the well construction equipment in a manner that minimizes consumption rate of fuel by the power equipment; and
wherein when the power manager is in a third instance of the modes of operation, the computer program code, when executed by the processor, causes the power manager to cause the power equipment to supply electrical power to the well construction equipment in a manner that maximizes operational life of the power equipment.

5. An apparatus comprising:
a power manager installable in association with a well construction rig, wherein the well construction rig comprises:
well construction equipment operable to perform well construction operations to construct a well;

power equipment electrically connected to the well construction equipment, wherein the power equipment is operable to supply electrical power to the well construction equipment to permit the well construction equipment to perform the well construction operations; and a plurality of power equipment sensors associated with the power equipment and operable to output power equipment sensor data indicative of operational status of the power equipment;

wherein the power manager is communicatively connectable with the power equipment and the power equipment sensors;

wherein the power manager comprises a processor and a memory storing a computer program code that, when executed by the processor, causes the power manager to:

receive the power equipment sensor data;

receive power management settings entered by a human user via a human-machine interface (HMI), wherein each power management setting is associated with a corresponding mode of operation of the power manager;

for each power management setting, change the mode of operation of the power manager to the mode of operation associated with that power management setting; and for each mode of operation, cause the power equipment to supply electrical power to the well construction equipment in a predetermined manner with respect to that mode of operation;

wherein the modes of operation are or comprise a plurality of minimum pollution modes of operation;

wherein each minimum pollution mode of operation is associated with a corresponding pollutant emitted by the power equipment; and wherein for each minimum pollutant mode of operation, the computer program code, when executed by the processor, causes the power manager to cause the power equipment to supply electrical power to the well construction equipment in a manner that minimizes emission rate of the gas associated with that minimum pollutant mode of operation.

6. The apparatus of claim 5 wherein the power equipment comprises:

an electric generator unit having:
an electric generator operable to generate the electrical power;
an internal combustion engine operatively connected to and operable to actuate the electric generator; and
an electrical energy storage unit electrically connected to and operable to store the electrical power generated by the electric generator.

7. The apparatus of claim 4 wherein when the power manager is in a fourth instance of the modes of operation, the computer program code, when executed by the processor, causes the power manager to cause the power equipment to supply electrical power to the well construction equipment in a manner that:

minimizes the emission rate of the pollutants by the power equipment;
minimizes the consumption rate of the fuel by the power equipment; and
maximizes the operational life of the power equipment.

8. The apparatus of claim 4 wherein the power equipment comprises:

an electric generator unit having:
an electric generator operable to generate the electrical power;
an internal combustion engine operatively connected to and operable to actuate the electric generator; and
an electrical energy storage unit electrically connected to and operable to store the electrical power generated by the electric generator.

9. A method comprising:

initiating operation of a power manager at a well construction rig, wherein the well construction rig comprises well construction equipment, power equipment electrically connected to the well construction equipment, and a plurality of power equipment sensors operable to output sensor data indicative of operational status of the power equipment, and wherein the operating power manager:

receives the power equipment sensor data;

receives power management settings entered via a human-machine interface (HMI), wherein each power management setting is associated with a corresponding mode of operation of the power manager;

for each power management setting, changes the mode of operation of the power manager to the mode of operation associated with that power management setting; and for each mode of operation, causes the power equipment to supply electrical power to the well construction equipment in a predetermined manner with respect to that mode of operation;

wherein when the power manager is in a first instance of the modes of operation, the operating power manager causes the power equipment to supply electrical power to the well construction equipment in a manner that minimizes emission rate of pollutants by the power equipment;

wherein when the power manager is in a second instance of the modes of operation, the operating power manager causes the power equipment to supply electrical power to the well construction equipment in a manner that minimizes consumption rate of fuel by the power equipment; and wherein when the power manager is in a third instance of the modes of operation, the operating power manager causes the power equipment to supply electrical power to the well construction equipment in a manner that maximizes operational life of the power equipment.

10. The method of claim 9 wherein when the power manager is in a fourth instance of the modes of operation, the operating power manager causes the power equipment to supply electrical power to the well construction equipment in a manner that:

minimizes the emission rate of the pollutants by the power equipment;
minimizes the consumption rate of the fuel by the power equipment; and
maximizes the operational life of the power equipment.

11. The method of claim 9 wherein the power equipment comprises:

an electric generator unit having:
an electric generator operable to generate the electrical power;
an internal combustion engine operatively connected to and operable to actuate the electric generator; and an electrical energy storage unit electrically connected to and operable to store the electrical power generated by the electric generator.

\* \* \* \* \*